(12) United States Patent
Johns et al.

(10) Patent No.: US 11,066,434 B2
(45) Date of Patent: Jul. 20, 2021

(54) METAL COMPLEXES COMPRISING ANILINE TYPE LIGANDS

(71) Applicant: Umicore AG & Co. KG, Hanau-Wolfgang (DE)

(72) Inventors: Adam M. Johns, Claremont, CA (US); Richard L. Pederson, Hanau-Wolfgang (DE); Doina Ene, Hanau-Wolfgang (DE); Ralf Karch, Hanau-Wolfgang (DE); Angelino Doppiu, Hanau-Wolfgang (DE)

(73) Assignee: Umicore AG & Co. KG

( * ) Notice: Subject to any disclaimer, the term of this patent is extended or adjusted under 35 U.S.C. 154(b) by 0 days.

(21) Appl. No.: 16/775,508

(22) Filed: Jan. 29, 2020

(65) Prior Publication Data

US 2020/0239504 A1  Jul. 30, 2020

Related U.S. Application Data

(60) Provisional application No. 62/798,473, filed on Jan. 30, 2019.

(51) Int. Cl.
*C07F 15/00*  (2006.01)

(52) U.S. Cl.
CPC .............................. *C07F 15/0046* (2013.01)

(58) Field of Classification Search
None
See application file for complete search history.

(56) References Cited

U.S. PATENT DOCUMENTS

2017/0190806 A1* 7/2017 Obrecht ................. B01J 31/181

FOREIGN PATENT DOCUMENTS

WO    WO-2018034931 A1    2/2018

* cited by examiner

*Primary Examiner* — Amy C Bonaparte
(74) *Attorney, Agent, or Firm* — Faegre Drinker Biddle & Reath LLP

(57) ABSTRACT

This invention relates generally to olefin metathesis catalysts comprising aniline type ligands, to the preparation of such catalysts, compositions comprising such catalysts, methods of using such catalysts, and the use of such catalysts in the metathesis of olefins. The invention has utility in the fields of catalysis, organic synthesis, polymer chemistry, and in industrial applications such as oil and gas, fine chemicals and pharmaceuticals.

8 Claims, 3 Drawing Sheets

METAL COMPLEXES COMPRISING ANILINE TYPE LIGANDS

CROSS-REFERENCE TO RELATED APPLICATIONS

This application claims priority to U.S. Application No. 62/798,473, filed Jan. 30, 2019, which is incorporated herein by reference in its entirety.

TECHNICAL FIELD

This invention relates generally to olefin metathesis catalysts comprising aniline type ligands, to the preparation of such catalysts, compositions comprising such catalysts, methods of using such catalysts, and the use of such catalysts in the metathesis of olefins. The invention has utility in the fields of catalysis, organic synthesis, polymer chemistry, and in industrial applications such as oil and gas, fine chemicals and pharmaceuticals.

BACKGROUND

Since its discovery in the 1950s, olefin metathesis has emerged as a valuable synthetic method for the formation of carbon-carbon double bonds. Recent advances in applications to organic syntheses and polymer syntheses mostly rely on developments of well-defined olefin metathesis catalysts.

The technology of ruthenium metathesis catalysts has enabled the development of several research platforms including: ring opening metathesis polymerization (ROMP), ring opening cross metathesis (ROCM), cross metathesis (CM), ring closing metathesis (RCM).

The incorporation of N-Heterocyclic Carbene (NHC) ligands or of cyclic alkyl amino carbene (CAAC) ligands, has played an essential role in the development of ruthenium metathesis catalysts. Metathesis catalysts, based on ruthenium, are known and have been studied.

However, there is an ongoing need for olefin metathesis catalysts, particularly ruthenium metathesis catalysts with improved characteristics which will further enable their use in a wider array of applications and olefin metathesis reactions, and for methods to prepare them.

SUMMARY OF THE INVENTION

To meet this need, the inventors have discovered various olefin metathesis catalysts, comprising aniline type ligands, represented by the structures represented by Formula (I), Formula (II) and Formula (III):

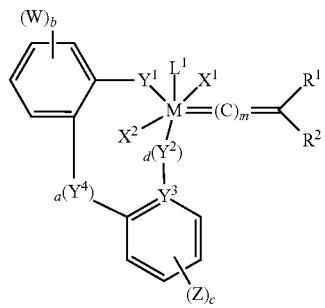

Formula (I)

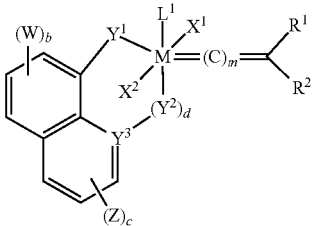

Formula (II)

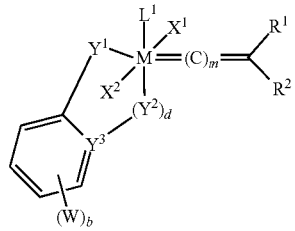

Formula (III)

wherein:

M is Ru or Os;

$L^1$ is a N-heterocyclic carbene (NHC) or a cycloalkyl amino carbene (CAAC);

m is 0, 1 or 2;

a is 0, 1, 2 or 3;

b is 0, 1, 2, 3 or 4;

c is 0, 1, 2, 3 or 4;

d is 0 when $Y^3$ is N;

d is 1 when $Y^3$ is C;

W is optionally substituted $C_{1-24}$ alkyl, optionally substituted $C_{3-8}$ cycloalkyl, halogen, optionally substituted $C_5$-$C_{24}$ aryl, optionally substituted $C_6$-$C_{24}$ aralkyl, optionally substituted $C_1$-$C_{20}$ heteroalkyl, —C(O)$R^{21}$, —O$R^{22}$, —CN, —N$R^{23}R^{24}$, NO$_2$, —CF$_3$, —(O)$_x R^{25}$, —P(O)(OH)$_2$, —OP(O)(OH)$_2$, —S$R^{27}$, or together with an adjacent W can form an optionally substituted unsaturated polycyclic ring;

Z is optionally substituted $C_{1-24}$ alkyl, optionally substituted $C_{3-8}$ cycloalkyl, halogen, optionally substituted $C_5$-$C_{24}$ aryl, optionally substituted $C_6$-$C_{24}$ aralkyl, optionally substituted $C_1$-$C_{20}$ heteroalkyl, —C(O)$R^{21}$, —O$R^{22}$, —CN, —N$R^{23}R^{24}$, NO$_2$, —CF$_3$, —S(O)$_x R^{25}$, —P(O)(OH)$_2$, —OP(O)(OH)$_2$, —S$R^{27}$, or together with an adjacent Z can form an optionally substituted unsaturated polycyclic ring;

$X^1$ and $X^2$ are independently anionic ligands; generally, $X^1$ and $X^2$ are independently halogen, trifluoroacetate, perfluorophenols, —NCO, —CN, —NCS, —N$_3$; or $X^1$ together with $X^2$ can form a nitrate; typically, $X^1$ and $X^2$ are independently halogen, or —NCO;

$R^1$ and $R^2$ are independently selected from hydrogen, optionally substituted hydrocarbyl, optionally substituted heteroatom-containing hydrocarbyl; or any two or more of $X^1$, $X^2$, $L^1$, $R^1$, and $R^2$ are taken together to form one or more cyclic groups;

$Y^1$ is —N$R^{1c}R^{2c}$—;

$R^{1c}$ is H or optionally substituted $C_{1-24}$ alkyl;

$R^{2c}$ is H or optionally substituted $C_{1-24}$ alkyl;

$Y^2$ is —N$R^{1d}R^{2d}$—;

$R^{1d}$ is H or optionally substituted $C_{1-24}$ alkyl;

$R^{2d}$ is H or optionally substituted $C_{1-24}$ alkyl;

$Y^4$ is —C$R^{1e}R^{2e}$—;

$R^{1e}$ is H or optionally substituted $C_{1-24}$ alkyl;

$R^{2e}$ is H or optionally substituted $C_{1-24}$ alkyl;

$R^{21}$ is OH, O$R^{26}$, N$R^{23}R^{24}$, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{22}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{23}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{24}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{25}$ is H, optionally substituted $C_{1-24}$ alkyl, $OR^{22}$, $-NR^{23}R^{24}$, optionally substituted heterocycle, optionally substituted $C_{3-8}$ cycloalkyl, optionally substituted $C_{5-24}$ aryl or optionally substituted $C_{3-8}$ cycloalkenyl;

$R^{26}$ is optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl; and $R^{27}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl.

In one embodiment, the invention provides a method of synthesizing the olefin metathesis catalysts of the invention.

In one embodiment, the invention provides a method of using the olefin metathesis catalysts of the invention in metathesis reactions. The olefin metathesis catalysts of the invention are of particular benefit for use in metathesis reactions, such as ring opening metathesis polymerization reactions, ring-opening cross metathesis reactions, cross metathesis reactions, ring-closing metathesis reactions, self-metathesis reactions, as well as combinations of such metathesis reactions.

The olefin metathesis catalysts of the invention are also key intermediates in the synthesis of a variety of ruthenium olefin metathesis catalysts.

These and other aspects of the present invention will be apparent to the skilled artisan in light of the following detailed description and examples. Furthermore, it is to be understood that none of the embodiments or examples of the invention described herein are to be interpreted as being limiting.

DETAILED DESCRIPTION

Figure 1:
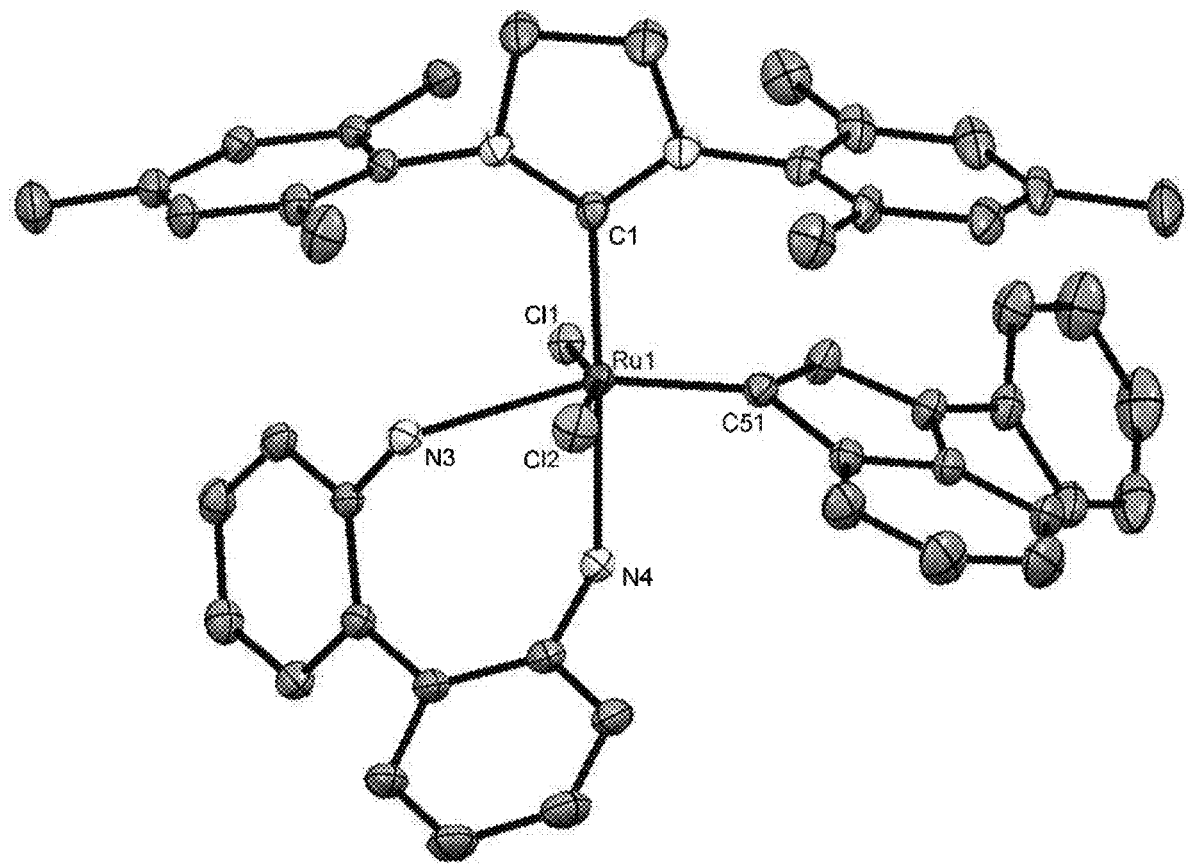
FIG. 1 shows the ORTEP diagram of catalyst C853.
Figure 2:
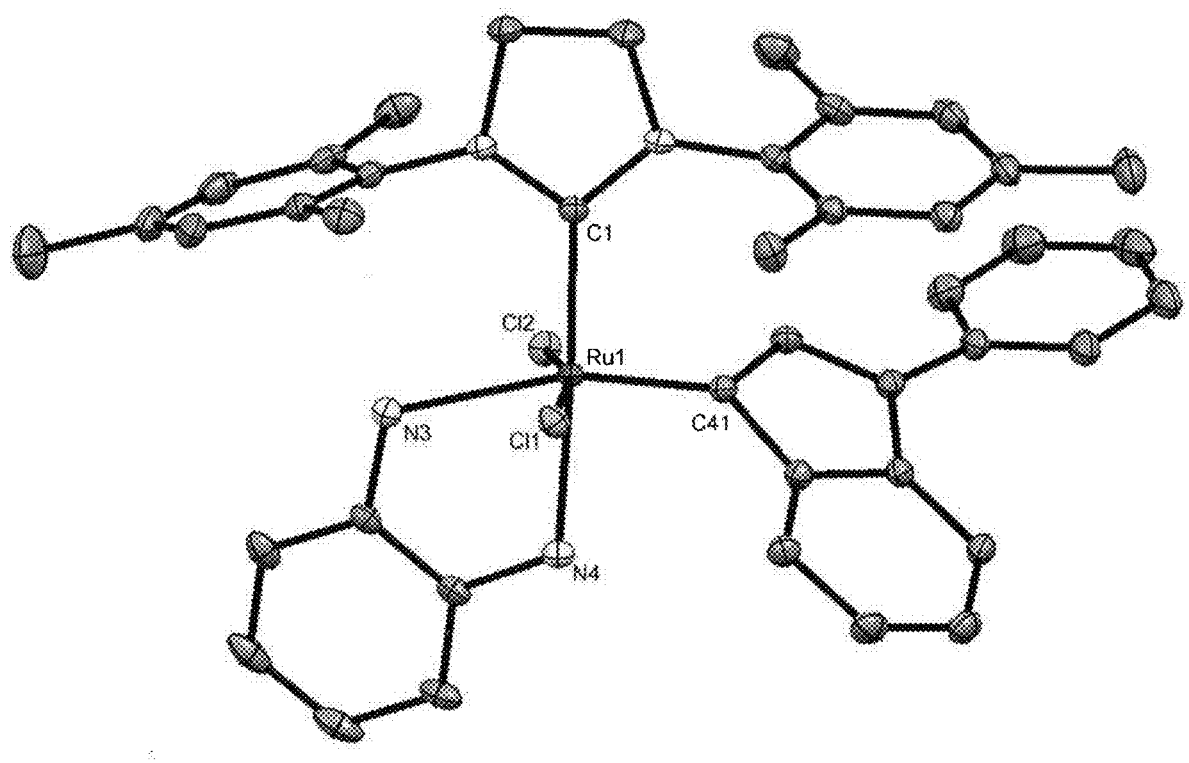
FIG. 2 shows the ORTEP diagram of catalyst C777.

In this specification and in the claims that follow, reference will be made to a number of terms, which shall be defined to have the meanings as described herein.

The term "alkyl" as used herein, refers to a linear, branched, saturated hydrocarbon group typically containing 1 to 24 carbon atoms, preferably 1 to 12 carbon atoms, more preferably 1 to 6 carbon atoms: such as methyl (Me), ethyl (Et), n-propyl (Pr or n-Pr), isopropyl (i-Pr), n-butyl (Bu or n-Bu), isobutyl (i-Bu), t-butyl (t-Bu), octyl (Oct), decyl, and the like.

The term "cycloalkyl" refers to a cyclic alkyl group, can be monocyclic, bicyclic or polycyclic, typically having 3 to 10, preferably 5 to 7, carbon atoms, generally, cycloalkyl groups are cyclopentyl (Cp), cyclohexyl (Cy), adamantyl (Ad).

The term "substituted alkyl" refers to alkyl substituted with one or more substituent groups, and the terms "heteroatom-containing alkyl" and "heteroalkyl" refer to alkyl in which at least one carbon atom is replaced with a heteroatom.

The term "alkylene" as used herein refers to a difunctional linear, branched alkyl group, where "alkyl" is as defined above.

The term "alkenyl" as used herein refers to a linear, branched hydrocarbon group of 2 to 24 carbon atoms containing at least one double bond, such as ethenyl, n-propenyl, isopropenyl, n-butenyl, iso-butenyl, octenyl, decenyl, tetradecenyl, hexadecenyl, and the like. Preferred alkenyl groups herein contain 2 to 12 carbon atoms, more preferred alkenyl groups herein contain 2 to 6 carbon atoms.

The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom.

The term "cycloalkenyl" refers to a cyclic alkenyl group, preferably having 3 to 8 carbon atoms.

The term "alkenylene" as used herein refers to a difunctional linear, branched, where "alkenyl" is as defined above.

The term "alkynyl" as used herein refers to a linear or branched hydrocarbon group of 2 to 24 carbon atoms containing at least one triple bond, such as ethynyl, n-propynyl, and the like. Preferred alkynyl groups herein contain 2 to 12 carbon atoms, more preferred alkynyl groups herein contain 2 to 6 carbon atoms.

The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom.

The term "alkynylene" as used herein refers to a difunctional alkynyl group, where "alkynyl" is as defined above.

The term "alkoxy" as used herein refers to an alkyl group bound through a single, terminal ether linkage; that is, an "alkoxy" group may be represented as —O-alkyl where "alkyl" is as defined above. Analogously, "alkenyloxy" refer to an alkenyl group bound through a single, terminal ether linkage, and "alkynyloxy" refers to an alkynyl group bound through a single, terminal ether linkage.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Preferred aryl groups contain 5 to 24 carbon atoms, and particularly preferred aryl groups contain 6 to 10 carbon atoms. Exemplary aryl groups contain one aromatic ring or two fused or linked aromatic rings, e.g., phenyl (Ph), naphthyl, biphenyl, diphenylether, diphenylamine, benzophenone, phenanthryl and the like.

"Substituted aryl" refers to an aryl moiety substituted with one or more substituent groups, and the terms "heteroatom containing aryl" and "heteroaryl" refer to aryl substituents in which at least one carbon atom is replaced with a heteroatom, as will be described in further detail herein.

The term "aryloxy" as used herein refers to an aryl group bound through a single, terminal ether linkage, wherein "aryl" is as defined above. An "aryloxy" group may be represented as —O-aryl where aryl is as defined above. Preferred aryloxy groups contain 5 to 24 carbon atoms, and particularly preferred aryloxy groups contain 6 to 10 carbon atoms. Examples of aryloxy groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the tem "aralkyl" refers to an alkyl group with an aryl substituent, wherein "aryl" and "alkyl" are as defined above. Preferred alkaryl and aralkyl groups contain 6 to 24 carbon atoms, and particularly preferred alkaryl and aralkyl groups contain 6 to 16 carbon atoms. Alkaryl groups include, without limitation, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like.

The terms "alkaryloxy" and "aralkyloxy" refer to substituents of the formula —OR wherein R is alkaryl or aralkyl, respectively, as defined herein.

The term "acyl" refers to substituents having the formula —(CO)-alkyl, —(CO)-aryl, —(CO)-aralkyl, —(CO)-alkaryl, —(CO)-alkenyl, or —(CO)-alkynyl, and the term "acyloxy" refers to substituents having the formula —O(CO)-alkyl, —O(CO)-aryl, —O(CO)-aralkyl, —O(CO)-alkaryl, —O(CO)-alkenyl, or —(CO)-alkynyl wherein "alkyl," "aryl", "aralkyl", "alkaryl", "alkenyl", and "alkynyl" are as defined above. The acetoxy group (—O(CO)CH$_3$, often abbreviated as —OAc) is a common example of an acyloxy group.

The terms "cyclic" and "ring" refer to alicyclic or aromatic groups that may or may not be substituted and/or heteroatom containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic or polycyclic.

The term "polycyclic ring" refers to alicyclic or aromatic groups that may or may not be substituted and/or heteroatom containing, and that have at least two closed rings tethered, fused, linked via a single bond or bridged. Polycyclic rings include without limitation naphthyl, biphenyl, phenanthryl and the like.

The term "spiro compound" refers to a chemical compound, that presents a twisted structure of two or more rings (a ring system), in which 2 or 3 rings are linked together by one common atom, The terms "halo" and "halogen" and "halide" are used in the conventional sense to refer to a fluorine (F), chlorine (Cl), bromine (Br), or iodine (I) substituent.

"Hydrocarbyl" refers to univalent hydrocarbyl moieties containing 1 to 24 carbon atoms, preferably 1 to 12 carbon atoms, including linear, branched, cyclic, saturated and unsaturated species, such as alkyl groups, alkenyl groups, alkynyl groups, aryl groups, and the like. "Substituted hydrocarbyl" refers to hydrocarbyl substituted with one or more substituent groups.

"Hydrocarbylene" refers to divalent hydrocarbyl moieties containing 1 to 24 carbon atoms, preferably 1 to 12 carbon atoms, including linear, branched, cyclic, saturated and unsaturated species, formed by removal of two hydrogens from a hydrocarbon. "Substituted hydrocarbylene" refers to hydrocarbylene substituted with one or more substituent groups.

The term "heteroatom-containing" as in a "heteroatom-containing hydrocarbyl group" refers to a hydrocarbon molecule or a hydrocarbyl molecular fragment in which one or more carbon atoms is replaced with an atom other than carbon, e.g., nitrogen, oxygen, sulfur, phosphorus or silicon, typically nitrogen, oxygen or sulfur. The term "heteroatom-containing hydrocarbylene" and heterohydrocarbylene" refer to hydrocarbylene in which at least one carbon atom is replaced with a heteroatom. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include without limitation alkoxyaryl, alkylsulfanyl-substituted alkyl, N-alkylated amino alkyl, and the like. Examples of heteroaryl substituents include without limitation pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups include without limitation pyrrolidino, morpholino, piperazine, piperidino, etc.

In addition, the aforementioned substituent groups may, if a particular group permits, be further substituted with one or more additional substituent groups or with one or more hydrocarbyl moieties such as those specifically enumerated above. Analogously, the above mentioned hydrocarbyl moieties may be further substituted with one or more substituent groups or additional hydrocarbyl moieties such as those specifically mentioned above. Analogously, the above-mentioned hydrocarbylene moieties may be further substituted with one or more substituent groups or additional hydrocarbyl moieties as noted above.

By "substituted" as in "substituted hydrocarbyl", "substituted alkyl", "substituted aryl", and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation groups such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, $C_6$-$C_{24}$ aralkyloxy, $C_6$-$C_{24}$ alkaryloxy, acyl (including $C_2$-$C_{24}$ alkylcarbonyl (—CO-alkyl) and $C_6$-$C_{24}$ arylcarbonyl (—CO-aryl)), acyloxy (—O-acyl, including $C_2$-$C_{24}$ alkylcarbonyloxy (—O—CO-alkyl) and $C_6$-$C_{24}$ arylcarbonyloxy (—O—CO-aryl)), $C_2$-$C_{24}$ alkoxycarbonyl (—(CO)—O-alkyl), $C_6$-$C_{24}$ aryloxycarbonyl (—(CO)—O-aryl), halocarbonyl (—CO)—X where X is halo), $C_2$-$C_{24}$ alkylcarbonato (—O—(CO)—O-alkyl), $C_6$-$C_{24}$ arylcarbonato (—O—(CO)—O-aryl), carboxylic acid (—COOH), carbamoyl (—(CO)—NH$_2$), mono-($C_1$-$C_{24}$ alkyl)-substituted carbamoyl (—(CO)—NH ($C_1$-$C_{24}$ alkyl)), di-($C_1$-$C_{24}$ alkyl)-substituted carbamoyl (—(CO)—N($C_1$-$C_{24}$ alkyl)$_2$), mono-($C_1$-$C_{24}$ haloalkyl)-substituted carbamoyl (—(CO)—NH($C_1$-$C_{24}$ haloalkyl)), di-($C_1$-$C_{24}$ haloalkyl)-substituted carbamoyl (—(CO)—N($C_1$-$C_{24}$ haloalkyl)$_2$), mono-($C_5$-$C_{24}$ aryl)-substituted carbamoyl (—(CO)—NH-aryl), di-($C_5$-$C_{24}$ aryl)-substituted carbamoyl (—(CO)—N($C_5$-$C_{24}$ aryl)$_2$), N($C_1$-$C_{24}$ alkyl)($C_5$-$C_{24}$ aryl)-substituted carbamoyl (—(CO)—N($C_1$-$C_{24}$ alkyl)($C_5$-$C_{24}$ aryl), thiocarbamoyl (—(CS)—NH$_2$), mono-(C$_1$-C$_{24}$ alkyl)-substituted thiocarbamoyl (—(CS)—NH(C$_1$-C$_{24}$ alkyl)), di-(C$_1$-C$_{24}$ alkyl)-substituted thiocarbamoyl (—(CS)—N(C$_1$-C$_{24}$ alkyl)$_2$), mono-(C$_5$-C$_{24}$ aryl)-substituted thiocarbamoyl (—(CS)—NH-aryl), di-(C$_5$-C$_{24}$ aryl)-substituted thiocarbamoyl (—(CS)—N(C$_5$-C$_{24}$ aryl)$_2$), N(C$_1$-C$_{24}$ alkyl)(C$_5$-C$_{24}$ aryl)-substituted thiocarbamoyl (—(CS)—N(C$_1$-C$_{24}$ alkyl)(C$_5$-C$_{24}$ aryl), carbamido (—NH—(CO)—NH$_2$), cyano (—C≡N), cyanato (—O—C≡N), thiocyanato (—S—C≡N), isocyanate (—NCO), thioisocyanate (—NCS), formyl (—(CO)—H), thioformyl (—(CS)—H), amino (—NH$_2$), mono-(C$_1$-C$_{24}$ alkyl)-substituted amino (—NH(C$_1$-C$_{24}$ alkyl), di-(C$_1$-C$_{24}$ alkyl)-substituted amino ((—N(C$_1$-C$_{24}$ alkyl)$_2$), mono-(C$_5$-C$_{24}$ aryl)-substituted amino (—NH(C$_5$-C$_{24}$ aryl), di-(C$_5$-C$_{24}$ aryl)-substituted amino (—N(C$_5$-C$_{24}$ aryl)$_2$), C$_2$-C$_{24}$ alkylamido (—NH—(CO)-alkyl), C$_6$-C$_{24}$ arylamido (—NH—(CO)-aryl), imino (—CRNH where, R includes without limitation H, C$_1$-C$_{24}$ alkyl, C$_5$-C$_{24}$ aryl, C$_6$-C$_{24}$ alkaryl, C$_6$-C$_{24}$ aralkyl, etc.), C$_2$-C$_{20}$ alkylimino (—CRN(alkyl), where R includes without limitation H, C$_1$-C$_{24}$ alkyl, C$_5$-C$_{24}$ aryl, C$_6$-C$_{24}$ alkaryl, C$_6$-C$_{24}$ aralkyl, etc.), arylimino (—CRN(aryl), where R includes without limitation H, C$_1$-C$_{20}$ alkyl, C$_5$-C$_{24}$ aryl, C$_6$-C$_{24}$ alkaryl, C$_6$-C$_{24}$ aralkyl, etc.), nitro (—NO$_2$), nitroso (—NO), sulfo (—S(O)$_2$OH), C$_1$-C$_{24}$ alkylsulfanyl (—S-alkyl; also termed "alkylthio"), C$_5$-C$_{24}$ arylsulfanyl (—S-aryl; also termed "arylthio"), C$_1$-C$_{24}$ alkylsulfinyl (—(SO)-alkyl), C$_5$-C$_{24}$ arylsulfinyl (—(SO)-aryl), C$_1$-C$_{24}$ alkylsulfonyl (—SO$_2$-alkyl), C$_1$-C$_{24}$ monoalkylaminosulfonyl (—SO$_2$—N(H) alkyl), C$_1$-C$_{24}$ dialkylaminosulfonyl (—SO$_2$—N(alkyl)$_2$), C$_5$-C$_{24}$ arylsulfonyl (—SO$_2$-aryl), boryl (—BH$_2$), borono (—B(OH)$_2$), boronato (—B(OR)$_2$ where R includes without limitation alkyl or other hydrocarbyl), phosphono (—P(O)(OH)$_2$), phospho (—PO$_2$), phosphine (—PH$_2$), silyl (—SiR$_3$ wherein R is H or hydrocarbyl), and silyloxy (—O-silyl); hydrocarbyl moieties C$_1$-C$_{24}$ alkyl (preferably C$_1$-C$_{12}$ alkyl, more preferably C$_1$-C$_6$ alkyl), C$_2$-C$_{24}$ alkenyl (preferably C$_2$-C$_{12}$ alkenyl, more preferably C$_2$-C$_6$ alkenyl), C$_2$-C$_{24}$ alkynyl (preferably C$_2$-C$_{12}$ alkynyl, more preferably C$_2$-C$_6$ alkynyl), C$_5$-C$_{24}$ aryl (preferably C$_6$-C$_{10}$ aryl), C$_6$-C$_{24}$ alkaryl (preferably C$_6$-C$_{16}$ alkaryl), or C$_6$-C$_{24}$ aralkyl (preferably C$_6$-C$_{16}$ aralkyl).

By "functionalized" as in "functionalized hydrocarbyl", "functionalized alkyl", "functionalized olefin", "functionalized cyclic olefin", and the like, is meant that in the hydrocarbyl, alkyl, olefin, cyclic olefin, or other moiety, at least one H atom bound to a carbon (or other) atom is replaced with one or more functional group(s) such as those described hereinabove. The term "functional group" is meant to include any functional species that is suitable for the uses described herein. In some cases, the terms "substituent" and "functional group" are used interchangeably.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

The term "aniline type ligand" as used herein, represents an optionally substituted phenyl linked to the metal via an amino group —NR$^x$R$^y$, wherein R$^x$ and R$^y$ are H or alkyl as defined herein.

The term "nil", as used herein, means absent or nonexistent.

The term "sulfhydryl" as used herein, represents a group of formula "—SH".

The term "hydroxyl" as used herein, represents a group of formula "—OH".

The term "carbonyl" as used herein, represents a group of formula "—C(O)—".

The term "ketone" as used herein, represents an organic compound having a carbonyl group linked to a carbon atom such as —C(O)R$^x$, wherein R$^x$ can be alkyl, aryl, cycloalkyl, cycloalkenyl, heterocycle as defined above.

The term "ester" as used herein, represents an organic compound having a carbonyl group linked to a carbon atom such as —C(O)OR$^x$ wherein R$^x$ can be alkyl, aryl, cycloalkyl, cycloalkenyl, heterocycle as defined above.

The term "amine" as used herein, represents a group of formula "—NR$^x$R$^y$", wherein R$^x$ and R$^y$ can be the same or independently H, alkyl, aryl, cycloalkyl, cycloalkenyl, heterocycle as defined above.

The term "carboxyl" as used herein, represents a group of formula "—C(O)O—".

The term "sulfonyl" as used herein, represents a group of formula "—SO$_2$-".

The term "sulfate" as used herein, represents a group of formula "—O—S(O)$_2$—O—".

The term "sulfonate" as used herein, represents a group of the formula "—S(O)$_2$—O—".

The term "amide" as used herein, represents a group of formula "—C(O)NR$^x$R$^y$", wherein R$^x$ and R$^y$ can be the same or independently H, alkyl, aryl, cycloalkyl, cycloalkenyl, heterocycle as defined above.

The term "sulfonamide" as used herein, represents a group of formula "—S(O)$_2$NR$^x$R$^y$" wherein R$^x$ and R$^y$ can be the same or independently H, alkyl, aryl, cycloalkyl, cycloalkenyl, heterocycle as defined above.

The term "sulfoxide" as used herein, represents a group of formula "—S(O)—".

The term "phosphoric acid" as used herein, represents a group of formula "—P(O)(OH)$_2$".

The term "phosphoric acid" as used herein, represents a group of formula "—OP(O)(OH)$_2$".

The term "sulphonic acid" as used herein, represents a group of formula "—S(O)$_2$OH".

The formula "H", as used herein, represents a hydrogen atom.

The formula "O", as used herein, represents an oxygen atom.

The formula "N", as used herein, represents a nitrogen atom.

The formula "S", as used herein, represents a sulfur atom.

Functional groups may be protected in cases where the functional group interferes with the metal carbene olefin metathesis catalyst, and any of the protecting groups commonly used in the art may be employed. Acceptable protecting groups may be found, for example, in Greene et al., *Protective Groups in Organic Synthesis*, 5th Ed. (New York: Wiley, 2014). Examples of protecting groups include acetals, cyclic acetals, boronate esters (boronates), cyclic boronate esters (cyclic boronates), carbonates, or the like. Examples of protecting groups include cyclic acetals or cyclic boronate esters.

Metal Carbene Olefin Metathesis Catalysts of the Invention

In one embodiment, the invention provides olefin metathesis catalysts, represented by the structures of Formula (I), Formula (II), or Formula (III), as described herein.

These formulae are formed by different moieties, as shown in Scheme (1), below:

Scheme (1)

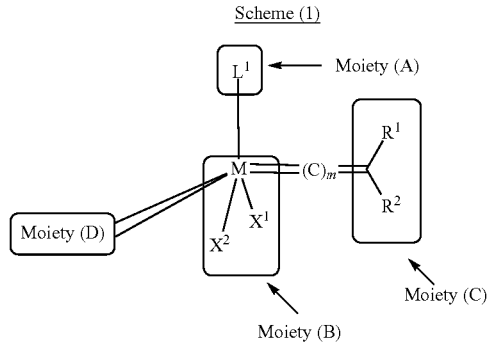

wherein Moiety (D) represents the aniline type ligands.

Table (1) exemplifies substructures of the Moiety (A), when $L^1$ is a CAAC or when $L^1$ when is an NHC. Depending on the values of $X^1$ and $X^2$, substructures of Moiety (B) are exemplified in Table (1). Depending on the values of $R^1$ and $R^2$, substructures of Moiety (C) are exemplified in Table (1). Different substructures of Moiety (D) are also found in Table (1). Any combination of a Moiety (A), Moiety (B), Moiety (C) and Moiety (D) can form a ruthenium carbene olefin metathesis catalyst of the invention, according to Formula (I), Formula (II) or Formula (III).

TABLE (1)-continued
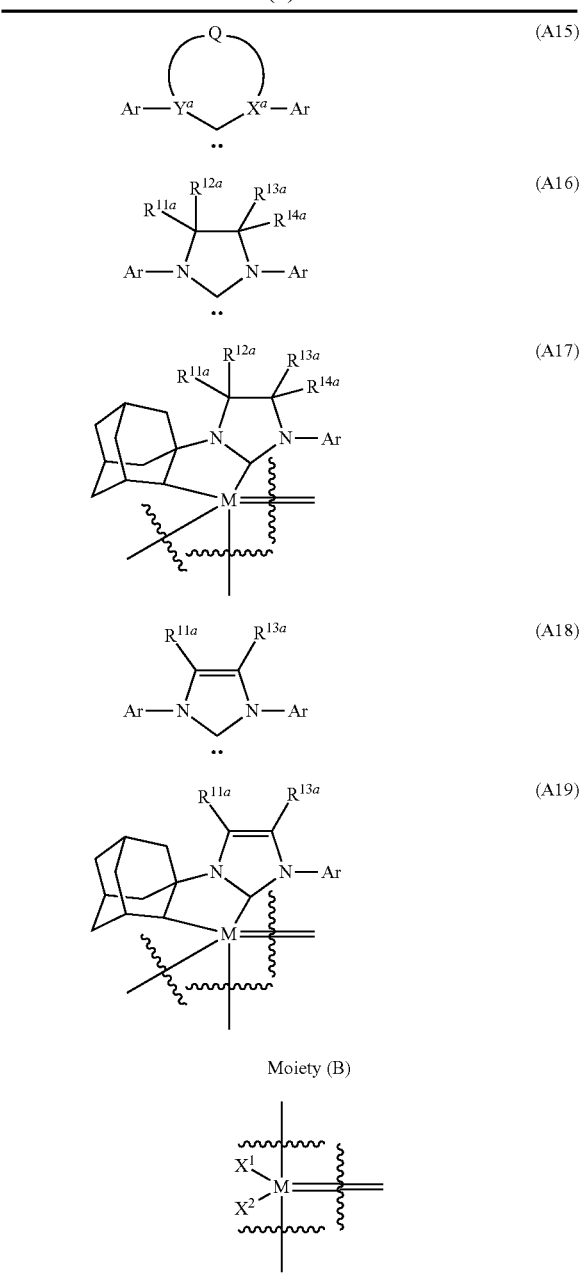
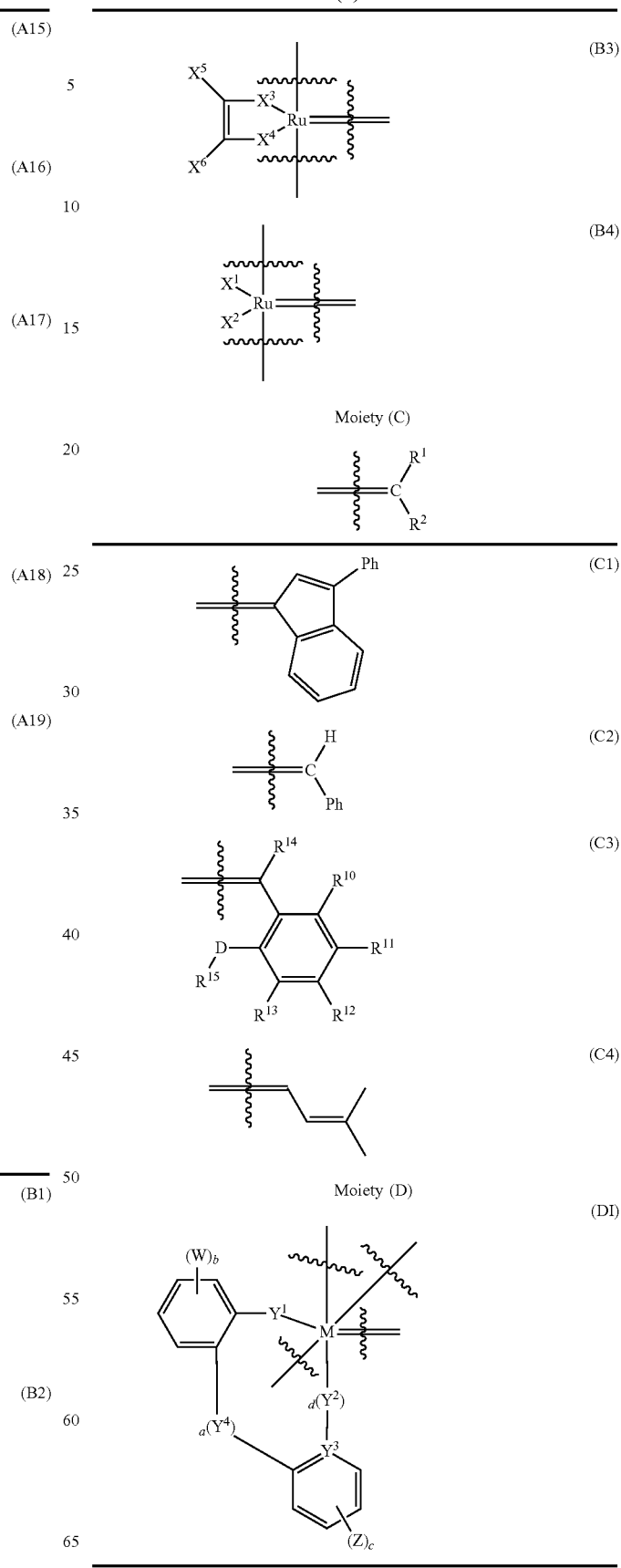

TABLE (1)-continued
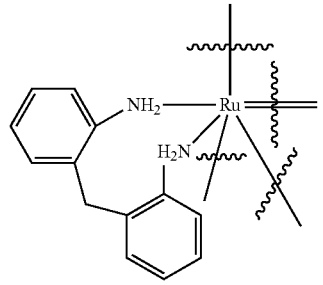
(DI1)
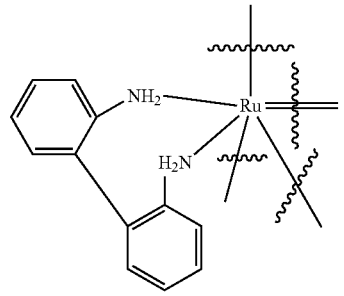
(DI2)
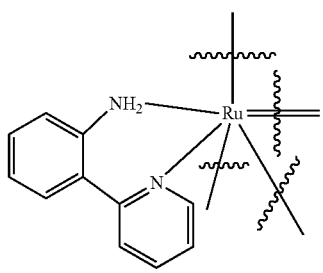
(DI3)
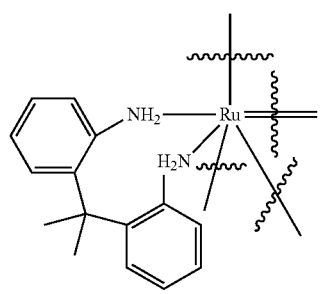
(DI4)
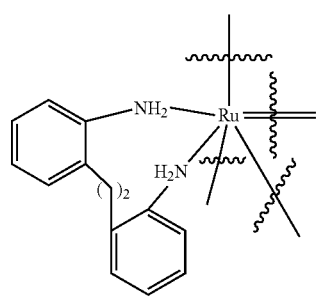
(DI5)
TABLE (1)-continued
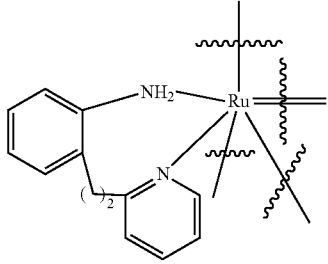
(DI6)
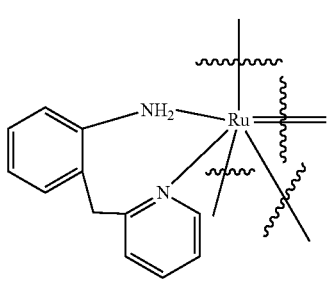
(DI7)
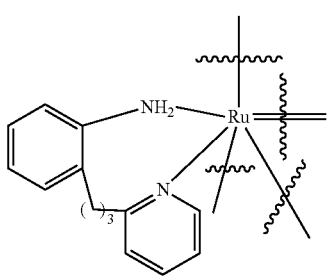
(DI8)
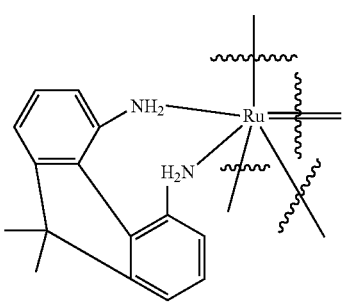
(DI9)
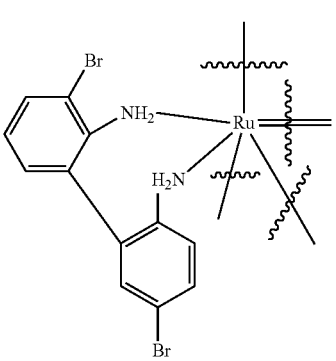
(DI10)

TABLE (1)-continued
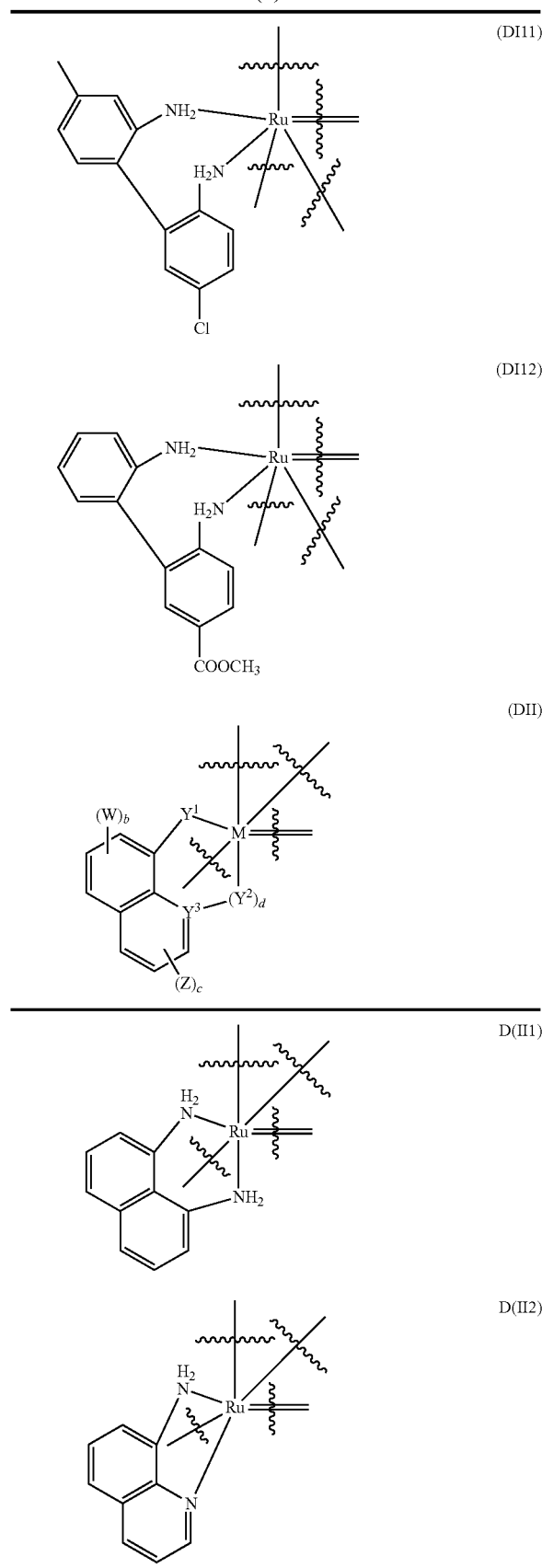
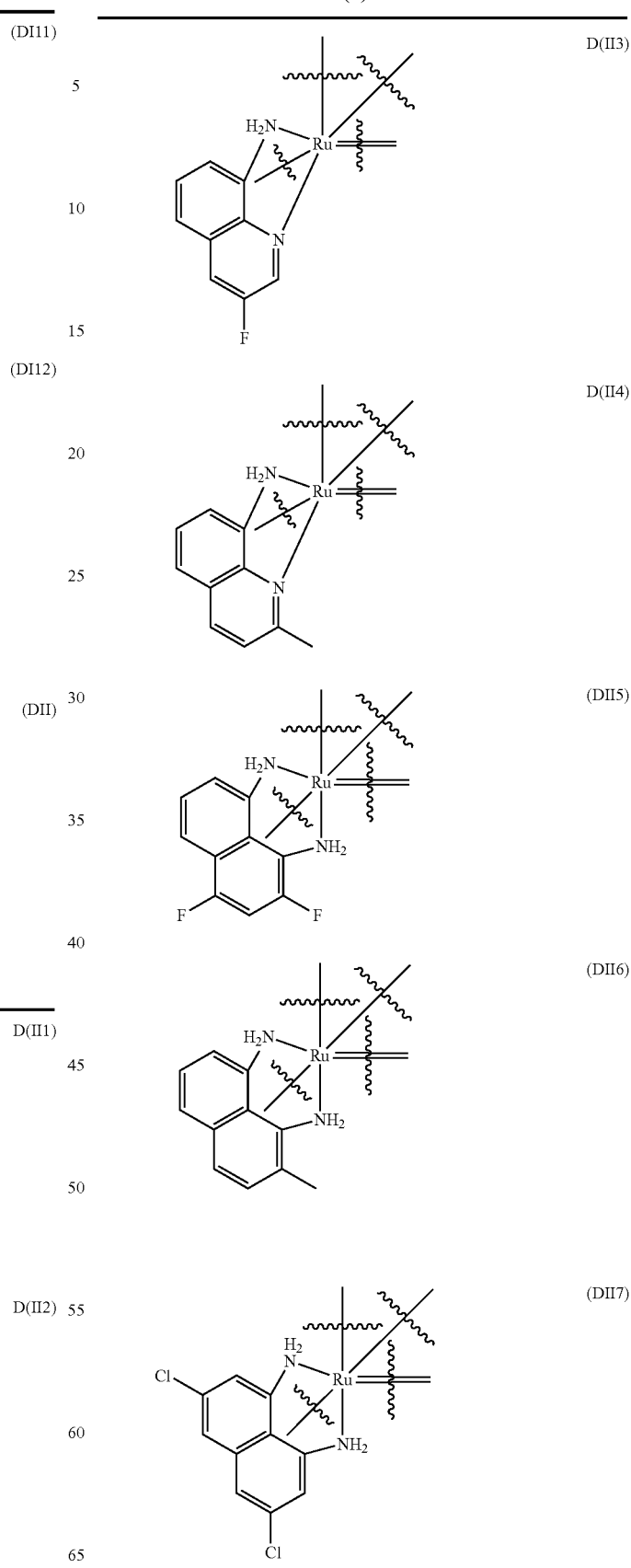

TABLE (1)-continued

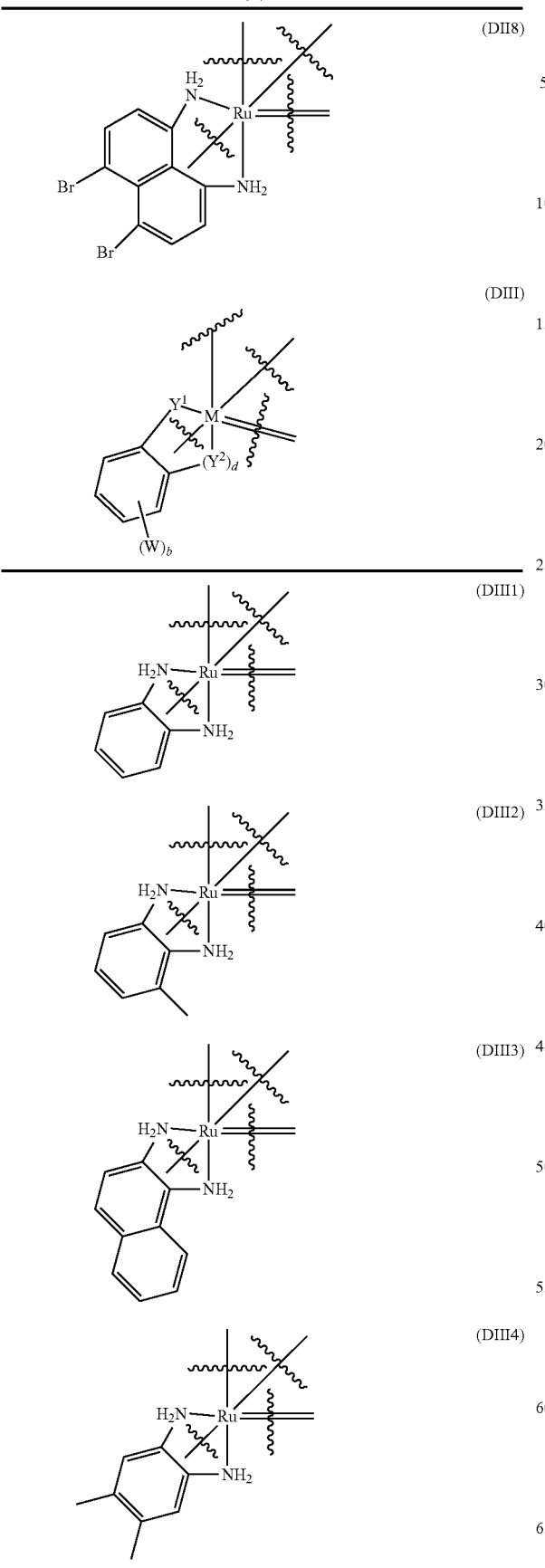

TABLE (1)-continued

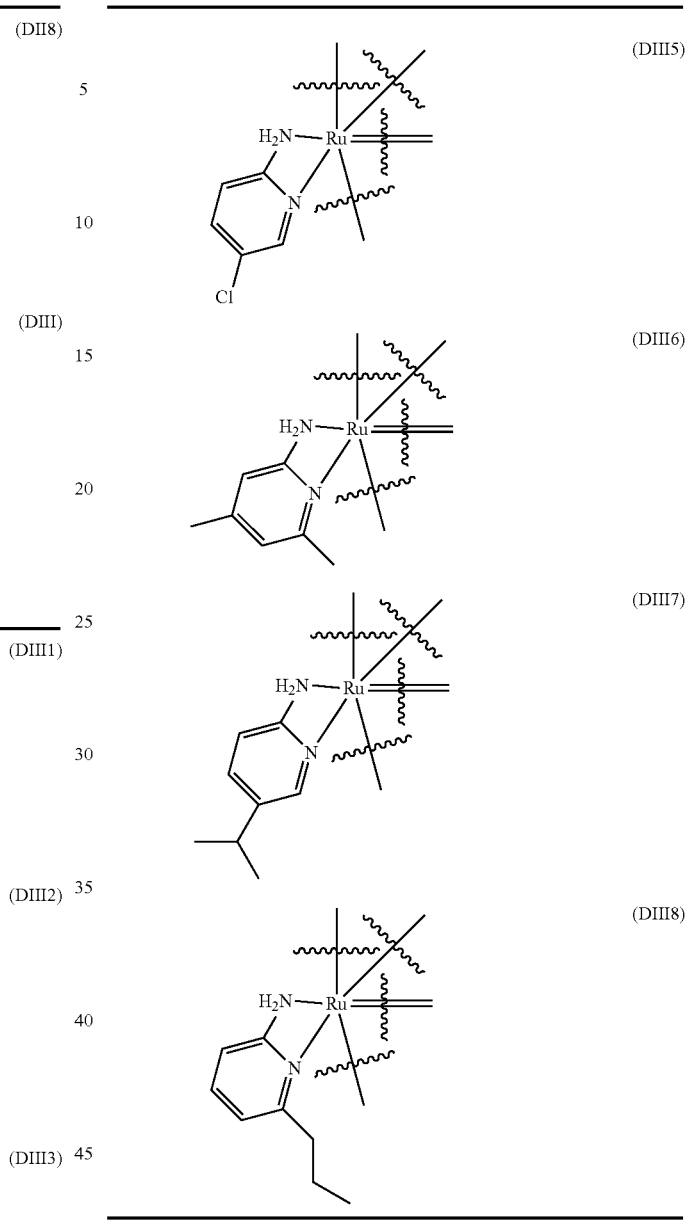

The values of the substituents described in Table (1) are as follows:

a is 0, 1, 2 or 3;
b is 0, 1, 2, 3 or 4;
c is 0, 1, 2, 3 or 4;
d is 0 when $Y^3$ is N; d is 1 when $Y^3$ is C;

W is optionally substituted $C_{1-24}$ alkyl, optionally substituted $C_{3-8}$ cycloalkyl, halogen, optionally substituted $C_5$-$C_{24}$ aryl, optionally substituted $C_6$-$C_{24}$ aralkyl, optionally substituted $C_1$-$C_{20}$ heteroalkyl, —C(O)$R^{21}$, —O$R^{22}$, —CN, —N$R^{23}R^{24}$, NO$_2$, —CF$_3$, —S(O)$_x R^{25}$, —P(O)(OH)$_2$, —OP(O)(OH)$_2$, —S$R^{27}$, or together with an adjacent W can form optionally substituted unsaturated polycyclic ring;

Z is optionally substituted $C_{1-24}$ alkyl, optionally substituted $C_{3-8}$ cycloalkyl, halogen, optionally substituted $C_5$-$C_{24}$ aryl, optionally substituted $C_6$-$C_{24}$ aralkyl, optionally substituted $C_1$-$C_{20}$ heteroalkyl, —C(O)$R^{21}$, —O$R^{22}$, —CN, —N$R^{23}R^{24}$, NO$_2$, —CF$_3$, —S(O)$_x R^{25}$, —P(O)(OH)$_2$, —OP (O)(OH)$_2$, —SR$^{27}$, or together with an adjacent Z can form optionally substituted unsaturated polycyclic ring;

M is Ru;

X$^1$ is an anionic ligand; generally, X$^1$ is halogen, trifluoroacetate, per-fluorophenols, —NCO, —CN, —NCS, —N$_3$; or together with X$^2$ can form a nitrate; typically; X$^1$ is halogen, or —NCO; specifically, in the present case X$^1$ is Cl;

X$^2$ is an anionic ligand; generally, X$^2$ is halogen, trifluoroacetate, per-fluorophenols, —NCO, —CN, —NCS, —N$_3$; or together with X$^1$ can form a nitrate; typically, X$^2$ is halogen, or —NCO; specifically, in the present case X$^2$ is Cl; or X$^1$ and X$^2$ together with the ruthenium can form

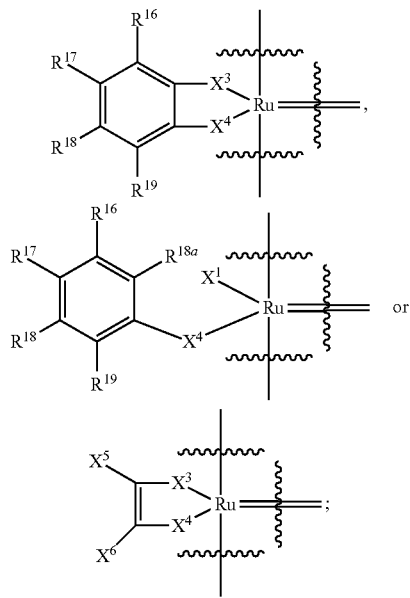

R$^1$ is hydrogen, optionally substituted hydrocarbyl, or optionally substituted heteroatom-containing hydrocarbyl; generally, R$^1$ is H; or together with R$^2$ can form a substituted indenylidene;

R$^2$ is hydrogen, optionally substituted hydrocarbyl, optionally substituted heteroatom-containing hydrocarbyl; generally, R$^2$ is optionally substituted C$_{2-24}$ alkenyl or optionally substituted phenyl or together with R$^1$ can form a substituted indenylidene;

R$^{1a}$ is H, optionally substituted C$_{1-24}$ alkyl, optionally substituted C$_{3-8}$ cycloalkyl, halogen, optionally substituted C$_5$-C$_{24}$ aryl, optionally substituted C$_6$-C$_{24}$ aralkyl, optionally substituted C$_1$-C$_{20}$ heteroalkyl, —(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, or together with R$^{2a}$ forms an optionally substituted spiro monocyclic or spiro polycyclic C$_{3-10}$ cycloalkyl or spiro heterocyclic ring, with the carbon atom to which they are attached, or together with R$^3$ or together with R$^4$ forms an optionally substituted polycyclic ring;

R$^{2a}$ is H, optionally substituted C$_{1-24}$ alkyl, optionally substituted C$_{3-8}$ cycloalkyl, halogen, optionally substituted C$_5$-C$_{24}$ aryl, optionally substituted C$_6$-C$_{24}$ aralkyl, optionally substituted C$_1$-C$_{20}$ heteroalkyl, —C(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, or together with R$^{1a}$ forms a spiro monocyclic or spiro polycyclic C$_{3-10}$ cycloalkyl or spiro heterocyclic ring, with the carbon atom to which they are attached, or together with R$^3$ or together with R$^4$ forms an optionally substituted polycyclic ring;

R$^{1b}$ is H, optionally substituted C$_{1-24}$ alkyl, optionally substituted C$_{3-8}$ cycloalkyl, halogen, optionally substituted C$_5$-C$_{24}$ aryl, optionally substituted C$_6$-C$_{24}$ aralkyl, optionally substituted C$_1$-C$_{20}$ heteroalkyl, —C(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, or together with R$^{2b}$ forms a five-, six-, or ten-membered cycloalkyl or heterocyclic ring, with the carbon atom to which they are attached;

R$^{2b}$ is H, optionally substituted C$_{1-24}$ alkyl, optionally substituted C$_{3-8}$ cycloalkyl, halogen, optionally substituted C$_5$-C$_{24}$ aryl, optionally substituted C$_6$-C$_{24}$ aralkyl, optionally substituted C$_1$-C$_{20}$ heteroalkyl, —C(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, or together with R$^{1b}$ forms a five-, six-, or ten-membered cycloalkyl or heterocyclic ring, with the carbon atom to which they are attached;

R$^3$ is H, optionally substituted C$_{1-24}$ alkyl, halogen, —(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, optionally substituted heterocycle, optionally substituted C$_{3-8}$ cycloalkyl, optionally substituted C$_{5-24}$ aryl, optionally substituted C$_{3-8}$ cycloalkenyl, or together with R$^{3a}$ can form an optionally substituted spiro monocyclic or spiro polycyclic C$_{3-10}$ cycloalkyl or together with R$^{1a}$ or together with R$^{2a}$ can form an optionally substituted polycyclic ring;

R$^{3a}$ is H, optionally substituted C$_{1-24}$ alkyl, halogen, —C(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, optionally substituted heterocycle, optionally substituted C$_{3-8}$ cycloalkyl, optionally substituted C$_{5-24}$ aryl, optionally substituted C$_{3-8}$ cycloalkenyl, or together with R$^3$ can form an optionally substituted spiro monocyclic or spiro polycyclic C$_{3-10}$ cycloalkyl or together with R$^{1a}$ or together with R$^{2a}$ can form an optionally substituted polycyclic ring;

R$^4$ is H, optionally substituted C$_{1-24}$ alkyl, halogen, —C(O)R$^{21}$, —OR$^{22}$, —CN, NR$^{23}$R$^{24}$, NO$_2$, —CF$_3$, —S(O)$_x$R$^{25}$, —P(O)(OH)$_2$, —OP(O)(OH)$_2$, —SR$^{27}$, optionally substituted heterocycle, optionally substituted C$_{3-8}$ cycloalkyl, optionally substituted C$_{5-24}$ aryl, optionally substituted C$_{3-8}$ cycloalkenyl, or together with R$^{4a}$ can form an optionally substituted spiro monocyclic or spiro polycyclic C$_{3-10}$ cycloalkyl or together with R$^{1a}$ or together with R$^{2a}$ can form an optionally substituted polycyclic ring;

R$^{4a}$ is H, optionally substituted C$_{1-24}$ alkyl, halogen, —C(O)R$^{21}$, —OR$^{22}$, —CN, —N$^{23}$R$^{24}$, NO$_2$, —CF$_3$, —S(O)$_x$R$^{25}$, —P(O)(OH)$_2$, —OP(O)(OH)$_2$, —SR$^{27}$, optionally substituted heterocycle, optionally substituted C$_{3-8}$ cycloalkyl, optionally substituted C$_{5-24}$ aryl, optionally substituted C$_{3-8}$ cycloalkenyl, or together with R$^4$ can form an optionally substituted spiro monocyclic or spiro polycyclic C$_{3-10}$ cycloalkyl or together with R$^{1a}$ or together with R$^{2a}$ can form an optionally substituted polycyclic ring;

the Ar groups can be identical or different;

Ar is

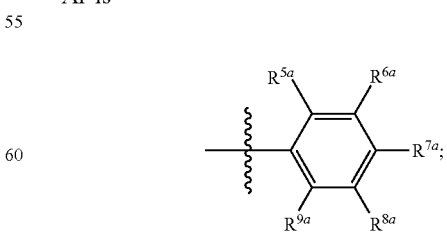

R$^{5a}$ is H, optionally substituted C$_{1-24}$ alkyl, halogen-C(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, optionally substituted heterocycle, optionally substituted $C_{3-8}$ cycloalkyl, optionally substituted $C_{5-24}$ aryl, optionally substituted $C_{3-8}$ cycloalkenyl, or together with $R^{6a}$ can form an optionally substituted polycyclic ring;

$R^{6a}$ is H, optionally substituted $C_{1-24}$ alkyl, halogen, —C(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, optionally substituted heterocycle, optionally substituted $C_{3-8}$ cycloalkyl, optionally substituted $C_{5-24}$ aryl, optionally substituted $C_{3-8}$ cycloalkenyl or together with $R^{5a}$ or together with $R^{7a}$ can form an optionally substituted polycyclic ring;

$R^{7a}$ is H, optionally substituted $C_{1-24}$ alkyl, halogen, —C(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, optionally substituted heterocycle, optionally substituted $C_{3-8}$ cycloalkyl, optionally substituted $C_{5-24}$ aryl, optionally substituted $C_{3-8}$ cycloalkenyl, or together with $R^{6a}$ or together with $R^{8a}$ can form an optionally substituted polycyclic ring;

$R^{8a}$ is H, optionally substituted $C_{1-24}$ alkyl, halogen-C(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, optionally substituted heterocycle, optionally substituted $C_{3-8}$ cycloalkyl, optionally substituted $C_{5-24}$ aryl, optionally substituted $C_{3-8}$ cycloalkenyl, or together with $R^{7a}$ or together with $R^{9a}$ can form an optionally substituted polycyclic ring;

$R^{9a}$ is H, optionally substituted $C_{1-24}$ alkyl, halogen, —C(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, optionally substituted heterocycle, optionally substituted $C_{3-8}$ cycloalkyl, optionally substituted $C_{5-24}$ aryl, optionally substituted $C_{3-8}$ cycloalkenyl, or together with rea can form a polycyclic ring;

$X^a$ and $Y^a$ are independently N, O, S, or P; typically, $X^a$ and $Y^a$ are both N;

$Q^1$ and $Q^2$ are independently hydrogen, unsubstituted hydrocarbyl, substituted hydrocarbyl, unsubstituted heteroatom-containing hydrocarbyl, or substituted heteroatom-containing hydrocarbyl; generally, $Q^1$, $Q^2$ are optionally linked to $X^a$ or $Y^a$ via a linker such as unsubstituted hydrocarbylene, substituted hydrocarbylene, unsubstituted heteroatom-containing hydrocarbylene, substituted heteroatom-containing hydrocarbylene, or —(CO)—; typically, $Q^1$, $Q^2$, are directly linked to $X^a$ or $Y^a$;

p is 0 when $X^a$ is O or S and p is 1 when $X^a$ is N or P; q is 0 when $Y^a$ is O or S and q is 1 when $Y^a$ is N or P;

Q is a linker, typically unsubstituted hydrocarbylene, substituted hydrocarbylene, unsubstituted heteroatom-containing hydrocarbylene, or substituted heteroatom-containing hydrocarbylene; generally Q is a two-atom linkage having the structure —[CR$^{11a}$R$^{12a}$]$_s$— [CR$^{13a}$R$^{14a}$]$_t$— or —[CR$^{11a}$=CR$^{13a}$]—; typically Q is —[CR$^{11a}$R$^{12a}$]$_s$—[CR$^{13a}$R$^{14a}$]$_t$—, wherein R$^{11a}$, R$^{12a}$, R$^{13a}$, and R$^{14a}$, are independently hydrogen, unsubstituted hydrocarbyl, substituted hydrocarbyl, unsubstituted heteroatom-containing hydrocarbyl, or substituted heteroatom-containing hydrocarbyl; typically R$^{11a}$, R$^{12a}$, R$^{13a}$ and R$^{14a}$ are independently hydrogen, unsubstituted $C_1$-$C_{12}$ alkyl, substituted $C_1$-$C_{12}$ alkyl, unsubstituted $C_1$-$C_{12}$ heteroalkyl, substituted $C_1$-$C_{12}$ heteroalkyl, unsubstituted $C_5$-$C_{14}$ aryl, or substituted $C_5$-$C_{14}$ aryl; "s" and "t" are independently 1 or 2; typically "s" and "t" are independently 1; or any two of R$^{11a}$, R$^{12a}$, R$^{13a}$, and R$^{14a}$, are optionally linked together to form a substituted or unsubstituted, saturated or unsaturated ring structure;

D is O, halogen, NR$^{20}$ or S;

$R^{10}$ is H, optionally substituted $C_{1-24}$ alkyl, halogen, —C(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, optionally substituted heterocycle, optionally substituted $C_{3-8}$ cycloalkyl, optionally substituted $C_{5-24}$ aryl, optionally substituted $C_{3-8}$ cycloalkenyl or together with $R^{11}$ can form a polycyclic ring;

$R^{11}$ is H, optionally substituted $C_{1-24}$ alkyl, halogen, —C(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, optionally substituted heterocycle, optionally substituted $C_{3-8}$ cycloalkyl, optionally substituted $C_{5-24}$ aryl, optionally substituted $C_{3-8}$ cycloalkenyl or together with $R^{10}$ or together with $R^{12}$ can form a polycyclic ring;

$R^{12}$ is H, optionally substituted $C_{1-24}$ alkyl, halogen, —C(O)R$^{21}$, —OR$^{22}$, CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, —NHC(O)CF$_3$, optionally substituted heterocycle, optionally substituted $C_{3-8}$ cycloalkyl, optionally substituted $C_{5-24}$ aryl, optionally substituted $C_{3-8}$ cycloalkenyl or together with $R^{11}$ or together with $R^{13}$ can form a polycyclic ring;

$R^{13}$ is H, optionally substituted $C_{1-24}$ alkyl, halogen, —C(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, optionally substituted heterocycle, optionally substituted $C_{3-8}$ cycloalkyl, optionally substituted $C_{5-24}$ aryl, optionally substituted $C_{3-8}$ cycloalkenyl or together with $R^{12}$ can form a polycyclic ring;

$R^{14}$ is H, optionally substituted $C_{1-24}$ alkyl, halogen, —C(O)R$^{21}$, —OR$^{22}$, CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, optionally substituted heterocycle, optionally substituted $C_{3-8}$ cycloalkyl, optionally substituted $C_{5-24}$ aryl or optionally substituted $C_{3-8}$ cycloalkenyl;

$R^{15}$ is H, optionally substituted $C_{1-24}$ alkyl, —C(R$^{28}$)(R$^{29}$)COOR$^{30}$, —C(R$^{28}$)(R$^{29}$)C(O)H, —C(R$^{28}$)(R$^{29}$)C(O)R$^{31}$, —C(R$^{28}$)(R$^{29}$)CR$^{32}$(OR$^{33}$)(OR$^{34}$), —C(R$^{28}$)(R$^{29}$)C(O)NR$^{35}$R$^{36}$, —C(R$^{28}$)(R$^{29}$)C(O)NR$^{35}$OR$^{34}$, —C(O)R$^{21}$, optionally substituted heterocycle, optionally substituted $C_{3-8}$ cycloalkyl, optionally substituted $C_{5-24}$ aryl, optionally substituted $C_{3-8}$ cycloalkenyl, or together with $R^{20}$ can form an optionally substituted heterocyclic ring or is nil when D is halogen;

$R^{16}$ is H, optionally substituted $C_{1-24}$ alkyl, halogen, —C(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, optionally substituted heterocycle, optionally substituted $C_{3-8}$ cycloalkyl, optionally substituted $C_{5-24}$ aryl or optionally substituted $C_{3-8}$ cycloalkenyl, or together with $R^{17}$ or together with $R^{18a}$ can form an optionally substituted polycyclic ring;

$R^{17}$ is H, optionally substituted $C_{1-24}$ alkyl, halogen, —C(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, optionally substituted heterocycle, optionally substituted $C_{3-8}$ cycloalkyl, optionally substituted $C_{5-24}$ aryl or optionally substituted $C_{3-8}$ cycloalkenyl, or together with $R^{16}$ or together with $R^{18}$ can form an optionally substituted polycyclic ring;

$R^{18}$ is H, optionally substituted $C_{1-24}$ alkyl, halogen, —C(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, optionally substituted heterocycle, optionally substituted $C_{3-8}$ cycloalkyl, optionally substituted $C_{5-24}$ aryl or optionally substituted $C_{3-8}$ cycloalkenyl, or together with $R^{17}$ or together with $R^{19}$ can form an optionally substituted polycyclic ring;

$R^{18a}$ is H, optionally substituted $C_{1-24}$ alkyl, halogen, —C(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, optionally substituted heterocycle, optionally substituted $C_{3-8}$ cycloalkyl, optionally substituted $C_{5-24}$ aryl or optionally substituted $C_{3-8}$ cycloalkenyl, or together with $R^{16}$ can form an optionally substituted polycyclic ring;

$R^{19}$ is H, optionally substituted $C_{1-24}$ alkyl, halogen, —C(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, optionally substituted heterocycle, optionally substituted $C_{3-8}$ cycloalkyl, optionally substituted $C_{5-24}$ aryl or optionally substituted $C_{3-8}$ cycloalkenyl, or together with $R^{18}$ can form an optionally substituted polycyclic ring;

$Y^1$ is —NR$^{1c}$R$^{2c}$—;
$R^{1c}$ is H or optionally substituted $C_{1-24}$ alkyl;
$R^{2c}$ is H or optionally substituted $C_{1-24}$ alkyl;
$Y^2$ is —NR$^{1d}$R$^{2d}$—;
$R^{1d}$ is H or optionally substituted $C_{1-24}$ alkyl;
$R^{2d}$ is H or optionally substituted $C_{1-24}$ alkyl;
$Y^4$ is —CR$^{1e}$R$^{2e}$—;
$R^{1e}$ is H or optionally substituted $C_{1-24}$ alkyl;
$R^{2e}$ is H or optionally substituted $C_{1-24}$ alkyl;
$R^{20}$ is H, optionally substituted $C_{1-24}$ alkyl, optionally substituted $C_{3-8}$ cycloalkyl, optionally substituted heterocycle, optionally substituted $C_{5-24}$ aryl, optionally substituted $C_{3-8}$ cycloalkenyl, or together with $R^{15}$ can form an optionally substituted heterocyclic ring;

$R^{21}$ is OH, OR$^{26}$, NR$^{23}$R$^{24}$, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{22}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{23}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{24}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

x is 1 or 2;

$R^{25}$ is H, optionally substituted $C_{1-24}$ alkyl, OR$^{22}$, —NR$^{23}$R$^{24}$, optionally substituted heterocycle, optionally substituted $C_{3-8}$ cycloalkyl, optionally substituted $C_{5-24}$ aryl or optionally substituted $C_{3-8}$ cycloalkenyl;

$R^{26}$ is optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{27}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{28}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{29}$ is H, optionally substituted $C_{1-24}$ alkyl, optionally substituted $C_{3-8}$ cycloalkyl, optionally substituted heterocycle, optionally substituted $C_{5-24}$ aryl, optionally substituted $C_{3-8}$ cycloalkenyl, or together with $R^{19}$ can form an optionally substituted heterocyclic ring;

$R^{30}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{31}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{32}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{33}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{34}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{35}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{36}$ is H, optionally substituted $C_{1-24}$ alkyl, —OR$^{22}$, optionally substituted $C_{3-8}$ cycloalkyl, optionally substituted heterocycle, optionally substituted $C_{5-24}$ aryl or optionally substituted $C_{3-8}$ cycloalkenyl;

$X^3$ is O or S; typically, $X^3$ is S;
$X^4$ is O or S; typically, $X^4$ is S;
$X^5$ is —CN or NO$_2$; typically, $X^5$ is —CN;
$X^6$ is —CN or NO$_2$; typically, $X^6$ is —CN; with the proviso that Table 1 does not cover the olefin metathesis catalysts of formulae

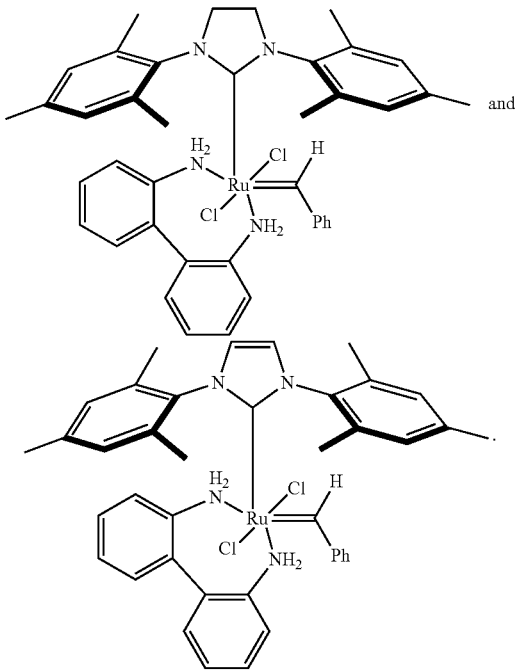

and

Therefore, the invention provides olefin metathesis catalysts, wherein the nomenclature of the olefin metathesis catalysts is determined by the combination of Moieties (A), (B), (C) and (D) according to Table (1).

For example, the olefin metathesis catalyst represented by the structure shown below is of general Formula (I) and is composed of Moiety (A16), Moiety (B4), Moiety (C1) and Moiety (DI2), therefore it is assigned Formula (A16B4C1DI2):

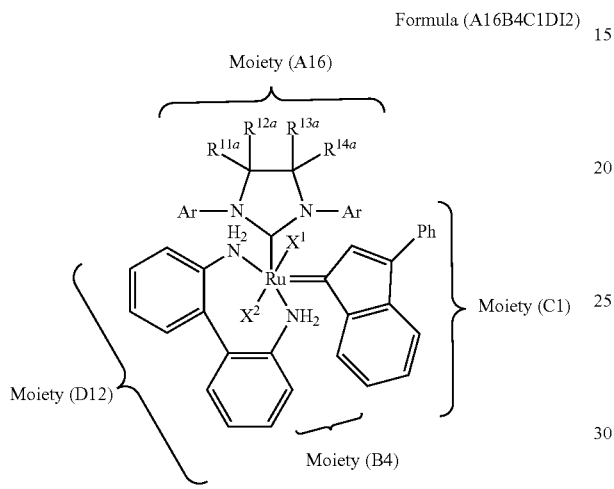

Formula (A16B4C1DI2)

In another example, the olefin metathesis catalyst represented by the structure shown below, is of general Formula (I) and is composed of Moieties (A16), Moiety (B4), Moiety (C4) and Moiety (DI2), therefore it is assigned Formula (A16B4C4DI2):

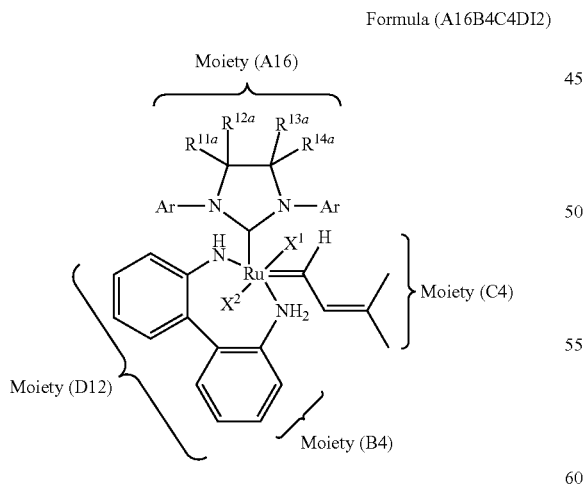

Formula (A16B4C4DI2)

Other non-limiting examples of olefin metathesis catalysts of the invention are represented by the structures shown below, wherein the nomenclature was assigned as described herein:

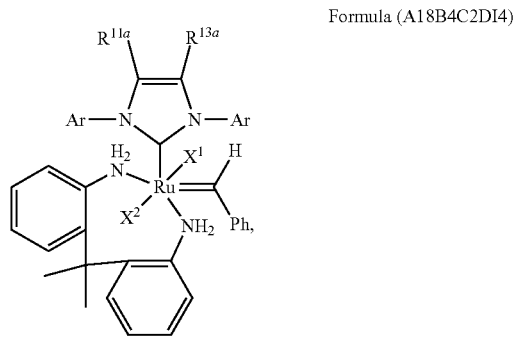

Formula (A18B4C2DI4)

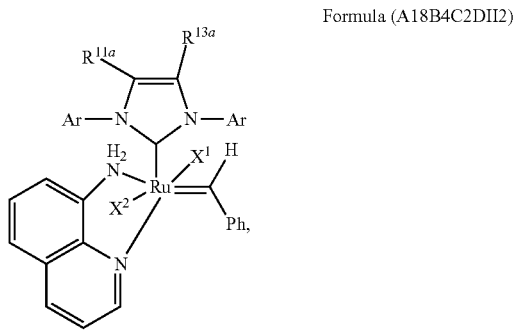

Formula (A18B4C2DII2)

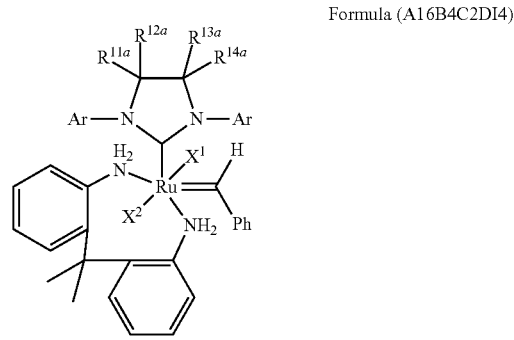

Formula (A16B4C2DI4)

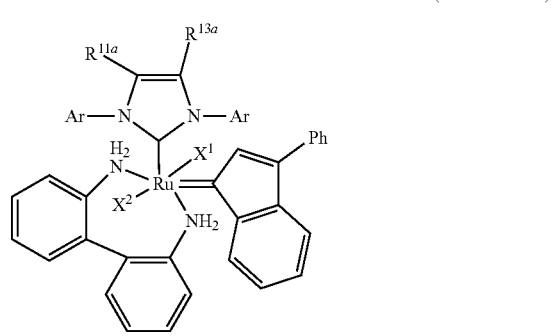

Formula (A18B4C1DI2)

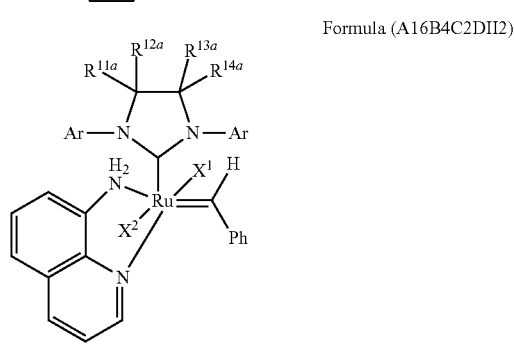

Formula (A16B4C2DII2)

-continued
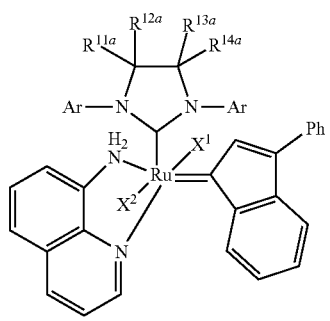
Formula (A16B4C1DII2)
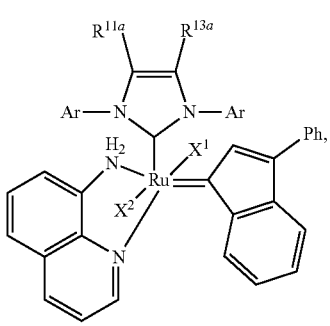
Formula (A18B4C1DII2)
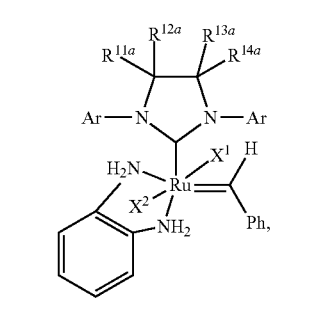
Formula (A16B4C2DIII1)
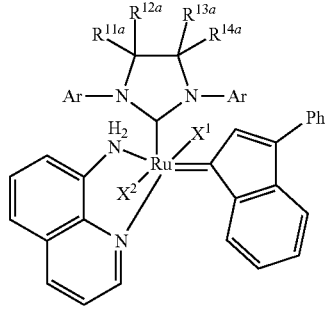
Formula (A16B4C1DII2)
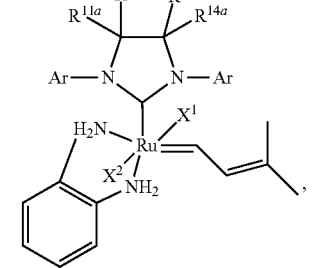
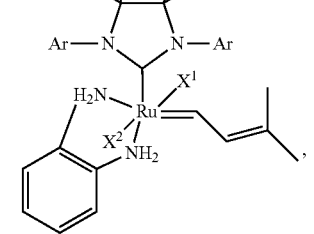
Formula (A16B4C4DIII1)
-continued
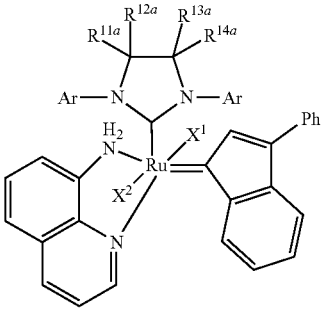
Formula (A16B4C1DII2)
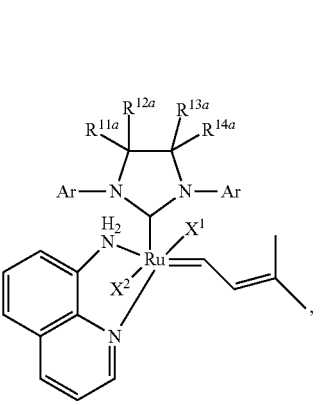
Formula (A16B4C4DII2)
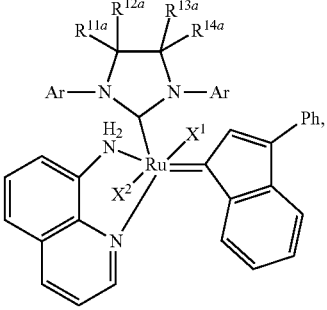
Formula (A16B4C1DII2)
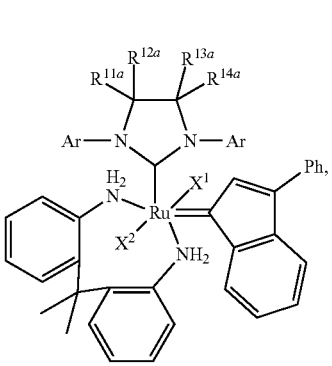
Formula (A16B4C1DI4)

Formula (A16B4C4DI4)

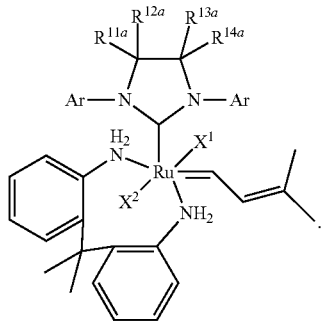

In one embodiment, the invention provides an olefin metathesis catalyst, represented by the structure of Formula (A16B4CDI), Formula (A16B4CDI)

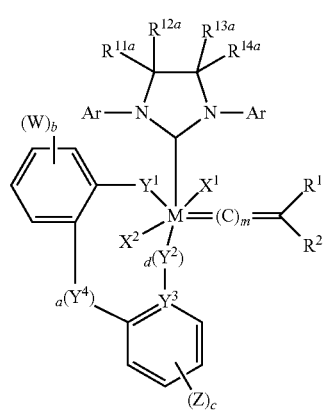

wherein:
m is 0, 1 or 2;
a is 0, 1, 2 or 3;
b is 0, 1, 2, 3 or 4;
c is 0, 1, 2, 3 or 4;
d is 0 when $Y^3$ is N; d is 1 when $Y^3$ is C;
W is optionally substituted $C_{1-24}$ alkyl, optionally substituted $C_{3-8}$ cycloalkyl, halogen, optionally substituted $C_5$-$C_{24}$ aryl, optionally substituted $C_6$-$C_{24}$ aralkyl, optionally substituted $C_1$-$C_{20}$ heteroalkyl, —C(O)$R^{21}$, —O$R^{22}$, —CN, —N$R^{23}R^{24}$, NO$_2$, —CF$_3$, —S(O)$_x R^{25}$, —P(O)(OH)$_2$, —OP(O)(OH)$_2$, —S$R^{27}$, or together with an adjacent W can form an optionally substituted unsaturated polycyclic ring;
Z is optionally substituted $C_{1-24}$ alkyl, optionally substituted $C_{3-8}$ cycloalkyl, halogen, optionally substituted $C_5$-$C_{24}$ aryl, optionally substituted $C_6$-$C_{24}$ aralkyl, optionally substituted $C_1$-$C_{20}$ heteroalkyl, —C(O)$R^{21}$, —O$R^{22}$, —CN, —N$R^{23}R^{24}$, NO$_2$, —CF$_3$, —S(O)$_x R^{25}$, —P(O)(OH)$_2$, —OP(O)(OH)$_2$, —S$R^{27}$, or together with an adjacent Z can form an optionally substituted unsaturated polycyclic ring;
$X^1$ and $X^2$ are independently anionic ligands; generally, $X^1$ and $X^2$ are independently halogen, trifluoroacetate, perfluorophenols, —NCO, —CN, —NCS, —N$_3$; or $X^1$ together with $X^2$ can form a nitrate; typically, $X^1$ and $X^2$ are independently halogen, or —NCO;
$R^1$ and $R^2$ are independently selected from hydrogen, optionally substituted hydrocarbyl, optionally substituted heteroatom-containing hydrocarbyl; or any two or more of $X^1$, $X^2$, $R^1$, and $R^2$ are taken together to form one or more cyclic groups;

$Y^1$ is —N$R^{1c}R^{2c}$—;
$R^{1c}$ is H or optionally substituted $C_{1-24}$ alkyl;
$R^{2c}$ is H or optionally substituted $C_{1-24}$ alkyl;
$Y^2$ is —N$R^{1d}R^{2d}$—;
$R^{1d}$ is H or optionally substituted $C_{1-24}$ alkyl;
$R^{2d}$ is H or optionally substituted $C_{1-24}$ alkyl;
$Y^4$ is —C$R^{1e}R^{2e}$—;
$R^{1e}$ is H or optionally substituted $C_{1-24}$ alkyl;
$R^{2e}$ is H or optionally substituted $C_{1-24}$ alkyl;
the Ar groups can be identical or different;
Ar is

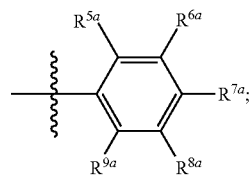

$R^{5a}$ is H, optionally substituted $C_{1-24}$ alkyl, halogen-C(O)$R^{21}$, —O$R^{22}$, —CN, —N$R^{23}R^{24}$, NO$_2$, —CF$_3$, —S(O)$_x R^{25}$, —P(O)(OH)$_2$, —OP(O)(OH)$_2$, —S$R^{27}$, optionally substituted heterocycle, optionally substituted $C_{3-8}$ cycloalkyl, optionally substituted $C_{5-24}$ aryl, optionally substituted $C_{3-8}$ cycloalkenyl, or together with $R^{6a}$ can form an optionally substituted polycyclic ring;
$R^{6a}$ is H, optionally substituted $C_{1-24}$ alkyl, halogen, —C(O)$R^{21}$, —O$R^{22}$, —CN, —N$R^{23}R^{24}$, NO$_2$, —CF$_3$, —S(O)$_x R^{25}$, —P(O)(OH)$_2$, —OP(O)(OH)$_2$, —S$R^{27}$, optionally substituted heterocycle, optionally substituted $C_{3-8}$ cycloalkyl optionally substituted $C_{5-24}$ aryl, optionally substituted $C_{3-8}$ cycloalkenyl or together with $R^{5a}$ or together with $R^{7a}$ can form an optionally substituted polycyclic ring;
$R^{7a}$ is H, optionally substituted $C_{1-24}$ alkyl, halogen, —C(O)$R^{21}$, —O$R^{22}$, —CN, —N$R^{23}R^{24}$, NO$_2$, —CF$_3$, —S(O)$_x R^{25}$, —P(O)(OH)$_2$, —OP(O)(OH)$_2$, —S$R^{27}$, optionally substituted heterocycle, optionally substituted $C_{3-8}$ cycloalkyl, optionally substituted $C_{5-24}$ aryl, optionally substituted $C_{3-8}$ cycloalkenyl, or together with $R^{6a}$ or together with $R^{8a}$ can form an optionally substituted polycyclic ring;
$R^{8a}$ is H, optionally substituted $C_{1-24}$ alkyl, halogen-C(O)$R^{21}$, —O$R^{22}$, —CN, —N$R^{23}R^{24}$, NO$_2$, —CF$_3$, —S(O)$_x R^{25}$, —P(O)(OH)$_2$, —OP(O)(OH)$_2$, —S$R^{27}$, optionally substituted heterocycle, optionally substituted $C_{3-8}$ cycloalkyl, optionally substituted $C_{5-24}$ aryl, optionally substituted $C_{3-8}$ cycloalkenyl, or together with $R^{7a}$ or together with $R^{9a}$ can form an optionally substituted polycyclic ring;
$R^{9a}$ is H, optionally substituted $C_{1-24}$ alkyl, halogen, —C(O)$R^{21}$, —O$R^{22}$, —CN, —N$R^{23}R^{24}$, NO$_2$, —CF$_3$, —S(O)$_x R^{25}$, —P(O)(OH)$_2$, —OP(O)(OH)$_2$, —S$R^{27}$, optionally substituted heterocycle, optionally substituted $C_{3-8}$ cycloalkyl, optionally substituted $C_{5-24}$ aryl, optionally substituted $C_{3-8}$ cycloalkenyl, or together with $R^{8a}$ can form a polycyclic ring;
$R^{21}$ is OH, O$R^{26}$, N$R^{23}R^{24}$, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;
$R^{22}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{23}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{24}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{25}$ is H, optionally substituted $C_{1-24}$ alkyl, $OR^{22}$, $-NR^{23}R^{24}$, optionally substituted heterocycle, optionally substituted $C_{3-8}$ cycloalkyl, optionally substituted $C_{5-24}$ aryl or optionally substituted $C_{3-8}$ cycloalkenyl;

$R^{26}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{11a}$, $R^{12a}$, $R^{13a}$ and $R^{14a}$ are independently hydrogen, unsubstituted $C_1$-$C_{12}$ alkyl, substituted $C_1$-$C_{12}$ alkyl, unsubstituted $C_1$-$C_{12}$ heteroalkyl, substituted $C_1$-$C_{12}$ heteroalkyl, unsubstituted $C_5$-$C_{14}$ aryl, or substituted $C_5$-$C_{14}$ aryl; or any two of $R^{11a}$, $R^{12a}$, $R^{13a}$, and $R^{14a}$, are optionally linked together to form an optionally substituted, saturated or unsaturated ring structure; with the proviso that the olefin metathesis catalyst of Formula (A16B4CDI) is not:

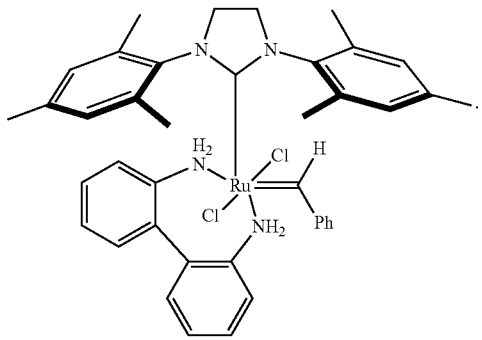

In one embodiment, the invention provides an olefin metathesis catalyst, represented by the structure of Formula (A16B4CDI), wherein:

m is 0;
a is 0 or 1;
b is 0, 1 or 2;
c is 0 or 1;
d is 1;
$Y^3$ is C;
W is optionally substituted $C_{1-12}$ alkyl, halogen, $-C(O)R^{21}$, $-OR^{22}$, $-CN$, $-NR^{23}R^{24}$, $NO_2$, $-CF_3$, $-S(O)_xR^{25}$, $-P(O)(OH)_2$, $-OP(O)(OH)_2$, or $-SR^{27}$;
Z is optionally substituted $C_{1-12}$ alkyl, halogen, $-C(O)R^{21}$, $-OR^{22}$, $-CN$, $-N^{23}R^{24}$, $NO_2$, $-CF_3$, $-S(O)_xR^{25}$, $-P(O)(OH)_2$, $-OP(O)(OH)_2$, or $-SR^{27}$;
$X^1$ and $X^2$ are independently halogen;
$R^1$ is hydrogen;
$R^2$ is optionally substituted phenyl, or optionally substituted 1-propenyl; or $R^1$ and $R^2$ together form an optionally substituted indenylid-1-ene;
$Y^1$ is $-NR^{1a}R^{2a}-$;
$R^{1a}$ is H, or optionally substituted $C_{1-12}$ alkyl;
$R^{2a}$ is H, or optionally substituted $C_{1-12}$ alkyl;
$Y^2$ is $-NR^{1b}R^{2b}-$;
$R^{1b}$ is H, or optionally substituted $C_{1-12}$ alkyl;
$R^{2b}$ is H, or optionally substituted $C_{1-12}$ alkyl;
$Y^4$ is $-CR^{1e}R^{2e}-$;

$R^{1e}$ is H or optionally substituted $C_{1-12}$ alkyl;
$R^{2e}$ is H or optionally substituted $C_{1-12}$ alkyl;
the Ar groups can be identical or different;
Ar is

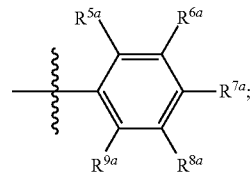

$R^{5a}$ is H, optionally substituted $C_{1-12}$ alkyl or halogen;
$R^{6a}$ is H, optionally substituted $C_{1-12}$ alkyl or halogen;
$R^{7a}$ is H, optionally substituted $C_{1-12}$ alkyl, or halogen;
$R^{8a}$ is H, optionally substituted $C_{1-12}$ alkyl, or halogen;
$R^{9a}$ is H, optionally substituted $C_{1-12}$ alkyl, or halogen; and $R^{11a}$, $R^{12a}$, $R^{13a}$ and $R^{14a}$ are independently hydrogen, optionally substituted $C_1$-$C_6$ alkyl, optionally substituted $C_1$-$C_{12}$ heteroalkyl, optionally substituted $C_5$-$C_{14}$ aryl, or any two of $R^{11a}$, $R^{12a}$, $R^{13a}$, and $R^{14a}$, are optionally linked together to form an optionally substituted, saturated or unsaturated ring structure; with the proviso that the olefin metathesis catalyst of Formula (A16B4CDI) is not:

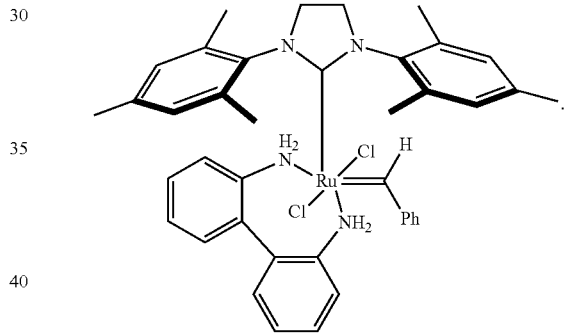

In one embodiment, the invention provides an olefin metathesis catalyst, represented by the structure of Formula (A16B4CDI):

m is 0;
a is 0;
b is 0, 1 or 2;
c is 0, 1 or 2;
d is 1;
$Y^3$ is C;
W is methyl, $-CN$, $-OCF_3$, chloro, $CH_3C(O)-$, i-propyl, fluoro, bromo, $CH_3OC(O)-$, $-N(CH_3)_2$, $-CF_3$;
Z is methyl, i-propyl, fluoro, $CH_3OC(O)-$, bromo, or $-N(CH_3)_2$;
$X^1$ and $X^2$ are independently chloro;
$R^1$ is hydrogen;
$R^2$ is phenyl or 2-methyl-1-propenyl; or $R^1$ and $R^2$ together form 3-phenyl-1-indenylidene;
$Y^1$ is $-NR^{1a}R^{2a}-$;
$R^{1a}$ is H;
$R^{2a}$ is H;
$Y^2$ is $-NR^{1b}R^{2b}-$;
$R^{1b}$ is H;
$R^{2b}$ is H;
the Ar groups can be identical or different;

Ar is

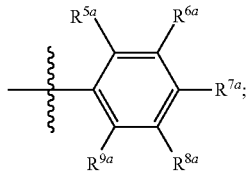

$R^{5a}$ is H, optionally substituted $C_{1-6}$ alkyl or halogen;
$R^{6a}$ is H, optionally substituted $C_{1-6}$ alkyl or halogen;
$R^{7a}$ is H, optionally substituted $C_{1-6}$ alkyl, or halogen;
$R^{8a}$ is H, optionally substituted $C_{1-6}$ alkyl, or halogen;
$R^{9a}$ is H, optionally substituted $C_{1-6}$ alkyl, or halogen; and
$R^{11a}$, $R^{12a}$, $R^{13a}$ and $R^{14a}$ are independently hydrogen;
with the proviso that the olefin metathesis catalyst of Formula (A16B4CDI) is not:

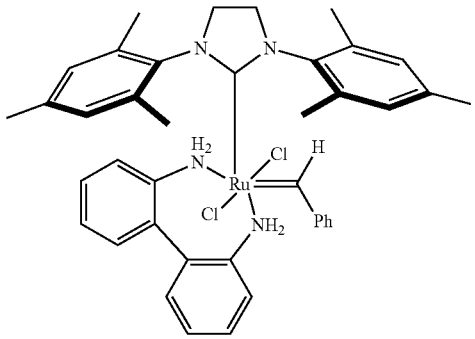

Examples of olefin metathesis catalysts represented by the structure of Formula (A16B4CDI), wherein: $X^1$=Cl, $X^2$=Cl, m=0, a=0, b=0, c=0, d=1, $Y^3$=C, $R^{1c}$=H, $R^{2c}$=H, $R^{1d}$=H, $R^{2d}$=H, $R^{11a}$=H, $R^{12a}$=H, $R^{13a}$=H, $R^{14a}$=H, are found in Table (2).

TABLE (2)

Examples of olefin metathesis catalysts represented by Formula (A16B4CDI)

| Catalyst | $R^1$ | $R^2$ | Ar | Ar |
|---|---|---|---|---|
| 1 | H | Ph | 2-F, 6-Me phenyl | 2-F, 6-Me phenyl |
| 2 | H | Ph | 2,6-di-i-Pr phenyl | 2,6-di-i-Pr phenyl |
| 3 | H | Ph | 2,6-di-Et phenyl | 2,6-di-Et phenyl |
| 4 | H | Ph | 2-Me, 6-i-Pr phenyl | 2-Me, 6-i-Pr phenyl |
| 5 | H | Ph | 2,6-di-Me phenyl | 2,6-di-Me phenyl |
| 6 | H | Ph | 2,6-di-F phenyl | 2,6-di-F phenyl |

TABLE (2)-continued

Examples of olefin metathesis catalysts represented by Formula (A16B4CDI)

| Catalyst | R¹ | R² | Ar | Ar |
|---|---|---|---|---|
| 7 | H | Ph | o-tolyl | o-tolyl |
| 8 | H | CH=CMe₂ | 2,4,6-trimethylphenyl | 2,4,6-trimethylphenyl |
| 9 | H | CH=CMe₂ | 2,6-diisopropylphenyl | 2,6-diisopropylphenyl |
| 10 | H | CH=CMe₂ | 2,6-diethylphenyl | 2,6-diethylphenyl |
| 11 | H | CH=CMe₂ | 2-methyl-6-isopropylphenyl | 2-methyl-6-isopropylphenyl |
| 12 | H | CH=CMe₂ | 2,6-dimethylphenyl | 2,6-dimethylphenyl |
| 13 | H | CH=CMe₂ | 2,6-difluorophenyl | 2,6-difluorophenyl |
| 14 | H | CH=CMe₂ | o-tolyl | o-tolyl |
| 15 | H | CH=CMe₂ | 2-fluoro-6-methylphenyl | 2-fluoro-6-methylphenyl |

TABLE (2)-continued

Examples of olefin metathesis catalysts represented by Formula (A16B4CDI)

| Catalyst | R¹ | R² | Ar | Ar |
|---|---|---|---|---|
| 16 | (alkylidene) | Ph-indenyl | 2,4,6-trimethylphenyl | 2,4,6-trimethylphenyl |
| 17 | (alkylidene) | Ph-indenyl | 2,6-di(i-Pr)phenyl | 2,6-di(i-Pr)phenyl |
| 18 | (alkylidene) | Ph-indenyl | 2,6-di(Et)phenyl | 2,6-di(Et)phenyl |
| 19 | (alkylidene) | Ph-indenyl | 2-Me-6-(i-Pr)phenyl | 2-Me-6-(i-Pr)phenyl |
| 20 | (alkylidene) | Ph-indenyl | 2,6-dimethylphenyl | 2,6-dimethylphenyl |
| 21 | (alkylidene) | Ph-indenyl | 2,6-difluorophenyl | 2,6-difluorophenyl |
| 22 | (alkylidene) | Ph-indenyl | 2-methylphenyl | 2-methylphenyl |
| 23 | (alkylidene) | Ph-indenyl | 2-F-6-methylphenyl | 2-F-6-methylphenyl |

In one embodiment, the invention provides an olefin metathesis catalyst, represented by the structure of Formula (A16B4CDII), Formula (A16B4CDII)

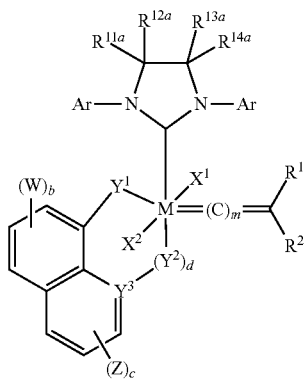

wherein: m is 0, 1 or 2;
b is 0, 1, 2 or 3;
c is 0, 1, 2 or 3;
d is 0 when $Y^3$ is N; d is 1 when $Y^3$ is C;
W is optionally substituted $C_{1-24}$ alkyl, optionally substituted $C_{3-8}$ cycloalkyl, halogen, optionally substituted $C_5$-$C_{24}$ aryl, optionally substituted $C_6$-$C_{24}$ aralkyl, optionally substituted $C_1$-$C_{20}$ heteroalkyl, —C(O)$R^{21}$, —O$R^{22}$, —CN, —N$R^{23}R^{24}$, NO$_2$, —CF$_3$, —S(O)$_x R^{25}$, —P(O)(OH)$_2$, —OP(O)(OH)$_2$, —S$R^{27}$, or together with an adjacent W can form optionally substituted unsaturated polycyclic ring;
Z is optionally substituted $C_{1-24}$ alkyl, optionally substituted $C_{3-8}$ cycloalkyl, halogen, optionally substituted $C_5$-$C_{24}$ aryl, optionally substituted $C_6$-$C_{24}$ aralkyl, optionally substituted $C_1$-$C_{20}$ heteroalkyl, —C(O)$R^{21}$, —O$R^{22}$, —CN, —N$R^{23}R^{24}$, NO$_2$, —CF$_3$, —S(O)$_x^{25}$, —P(O)(OH)$_2$, —OP(O)(OH)$_2$, —S$R^{27}$, or together with an adjacent Z can form optionally substituted unsaturated polycyclic ring;
$X^1$ and $X^2$ are independently anionic ligands; generally, $X^1$ and $X^2$ are independently halogen, trifluoroacetate, perfluorophenols, —NCO, —CN, —NCS, —N$_3$; or $X^1$ together with $X^2$ can form a nitrate; typically, $X^1$ and $X^2$ are independently halogen, or —NCO;
$R^1$ and $R^2$ are independently selected from hydrogen, optionally substituted hydrocarbyl, optionally substituted heteroatom-containing hydrocarbyl; or any two or more of $X^1$, $X^2$, $R^1$, and $R^2$ are taken together to form one or more cyclic groups;
$Y^1$ is —N$R^{1c}R^{2c}$—;
$R^{1c}$ is H or optionally substituted $C_{1-24}$ alkyl;
$R^{2c}$ is H or optionally substituted $C_{1-24}$ alkyl;
$Y^2$ is —N$R^{1d}R^{2d}$—;
$R^{1d}$ is H or optionally substituted $C_{1-24}$ alkyl;
$R^{2d}$ is H or optionally substituted $C_{1-24}$ alkyl;
$Y^4$ is —C$R^{1e}R^{2e}$—;
$R^{1e}$ is H or optionally substituted $C_{1-24}$ alkyl;
$R^{2e}$ is H or optionally substituted $C_{1-24}$ alkyl;
the Ar groups can be identical or different;
Ar is

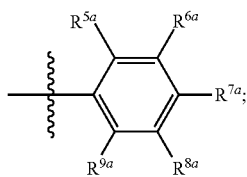

$R^{5a}$ is H, optionally substituted $C_{1-24}$ alkyl, halogen, —C(O)$R^{21}$, —O$R^{22}$, —CN, —N$R^{23}R^{24}$, NO$_2$, —CF$_3$, —S(O)$_x R^{25}$, —P(O)(OH)$_2$, —OP(O)(OH)$_2$, —S$R^{26}$, optionally substituted heterocycle, optionally substituted $C_{3-8}$ cycloalkyl, optionally substituted $C_{5-24}$ aryl, optionally substituted $C_{3-8}$ cycloalkenyl, or together with $R^{6a}$ can form an optionally substituted polycyclic ring;
$R^{6a}$ is H, optionally substituted $C_{1-24}$ alkyl, halogen, —C(O)$R^{21}$, —O$R^{22}$, —CN, —N$R^{23}R^{24}$, NO$_2$, —CF$_3$, —S(O)$_x R^{25}$, —P(O)(OH)$_2$, —OP(O)(OH)$_2$, —S$R^{26}$, optionally substituted heterocycle, optionally substituted $C_{3-8}$ cycloalkyl, optionally substituted $C_{5-24}$ aryl, optionally substituted $C_{3-8}$ cycloalkenyl or together with $R^{5a}$ or together with $R^{7a}$ can form an optionally substituted polycyclic ring;
$R^{7a}$ is H, optionally substituted $C_{1-24}$ alkyl, halogen, —C(O)$R^{21}$, —O$R^{22}$, —CN, —N$R^{23}R^{24}$, NO$_2$, —CF$_3$, —S(O)$_x R^{25}$, —P(O)(OH)$_2$, —OP(O)(OH)$_2$, —S$R^{26}$, optionally substituted heterocycle, optionally substituted $C_{3-8}$ cycloalkyl, optionally substituted $C_{5-24}$ aryl, optionally substituted $C_{3-8}$ cycloalkenyl, or together with $R^{6a}$ or together with $R^{8a}$ can form an optionally substituted polycyclic ring;
$R^{8a}$ is H, optionally substituted $C_{1-24}$ alkyl, halogen-C(O) $R^{21}$, —O$R^{22}$, —CN, —N$R^{23}R^{24}$, NO$_2$, —CF$_3$, —S(O)$_x R^{25}$, —P(O)(OH)$_2$, —OP(O)(OH)$_2$, —S$R^{26}$, optionally substituted heterocycle, optionally substituted $C_{3-8}$ cycloalkyl, optionally substituted $C_{5-24}$ aryl, optionally substituted $C_{3-8}$ cycloalkenyl, or together with $R^{7a}$ or together with $R^{9a}$ can form an optionally substituted polycyclic ring;
$R^{9a}$ is H, optionally substituted $C_{1-24}$ alkyl, halogen, —C(O)$R^{21}$, —O$R^{22}$, —CN, —N$R^{23}R^{24}$, NO$_2$, —CF$_3$, —S(O)$_x R^{25}$, —P(O)(OH)$_2$, —OP(O)(OH)$_2$, —S$R^{26}$, optionally substituted heterocycle, optionally substituted $C_{3-8}$ cycloalkyl, optionally substituted $C_{5-24}$ aryl, optionally substituted $C_{3-8}$ cycloalkenyl, or together with $R^{8a}$ can form a polycyclic ring;
$R^{21}$ is OH, O$R^{26}$, N$R^{23}R^{24}$, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;
$R^{22}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;
$R^{23}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;
$R^{24}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;
$R^{25}$ is H, optionally substituted $C_{1-24}$ alkyl, O$R^{22}$, —N$R^{23}R^{24}$, optionally substituted heterocycle, optionally substituted $C_{3-8}$ cycloalkyl, optionally substituted $C_{5-24}$ aryl or optionally substituted $C_{3-8}$ cycloalkenyl;
$R^{26}$ is optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;
$R^{27}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl; and
$R^{11a}$, $R^{12a}$, $R^{13a}$ and $R^{14a}$ are independently hydrogen, unsubstituted $C_1$-$C_{12}$ alkyl, substituted $C_1$-$C_{12}$ alkyl, unsubstituted $C_1$-$C_{12}$ heteroalkyl, substituted $C_1$-$C_{12}$ heteroalkyl, unsubstituted $C_5$-$C_{14}$ aryl, or substituted $C_5$-$C_{14}$ aryl; or any two of $R^{11a}$, $R^{12a}$, $R^{13a}$, and $R^{14a}$, are optionally linked together to form a substituted or unsubstituted, saturated or unsaturated ring structure.

In one embodiment, the invention provides an olefin metathesis catalyst, represented by the structure of Formula (A16B4CDII), wherein:
m is 0;
b is 0, 1 or 2;
c is 0 or 1;
d is 0 when $Y^3$ is N; d is 1 when $Y^3$ is C;
W is optionally substituted $C_{1-12}$ alkyl, halogen, —C(O)$R^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, or —SR$^{27}$;
Z is optionally substituted $C_{1-12}$ alkyl, halogen, —C(O)$R^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, or —SR$^{27}$;
$X^1$ and $X^2$ are independently halogen;
$R^1$ is hydrogen;
$R^2$ is optionally substituted phenyl, or optionally substituted 1-propenyl; or $R^1$ and $R^2$ together form an optionally substituted indenylid-1-ene;
$Y^1$ is —NR$^{1c}$R$^{2c}$—;
$R^{1c}$ is H or optionally substituted $C_{1-12}$ alkyl;
$R^{2c}$ is H or optionally substituted $C_{1-12}$ alkyl;
$Y^2$ is —NR$^{1d}$R$^{2d}$—;
$R^{1d}$ is H or optionally substituted $C_{1-12}$ alkyl;
$R^{2d}$ is H or optionally substituted $C_{1-12}$ alkyl;
the Ar groups can be identical or different;
Ar is

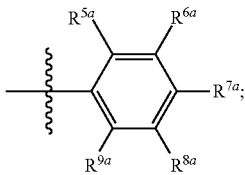

$R^{5a}$ is H, optionally substituted $C_{1-12}$ alkyl or halogen;
$R^{6a}$ is H, optionally substituted $C_{1-12}$ alkyl or halogen;
$R^{7a}$ is H, optionally substituted $C_{1-12}$ alkyl, or halogen;
$R^{8a}$ is H, optionally substituted $C_{1-12}$ alkyl, or halogen;
$R^{9a}$ is H, optionally substituted $C_{1-12}$ alkyl, or halogen; and
$R^{11a}$, $R^{12a}$, $R^{13a}$ and $R^{14a}$ are independently hydrogen, optionally substituted $C_1$-$C_6$ alkyl, optionally substituted $C_1$-$C_{12}$ heteroalkyl, optionally substituted $C_5$-$C_{14}$ aryl, or any two of $R^{11a}$, $R^{12a}$, $R^{13a}$, and $R^{14a}$, are optionally linked together to form a substituted or unsubstituted, saturated or unsaturated ring structure.

In one embodiment, the invention provides an olefin metathesis catalyst, represented by the structure of Formula (A16B4CDII), wherein:
m is 0;
b is 0 or 1;
c is 0 or 1;
d is 1; $Y^3$ is C;
W is methyl, ethyl, fluoro, bromo, chloro, or —CN;
Z is methyl, bromo or chloro;
$X^1$ and $X^2$ are independently chloro;
$R^1$ is hydrogen;
$R^2$ is phenyl or 2-methyl-1-propenyl; or $R^1$ and $R^2$ together form 3-phenyl-1-indenylidene;
$Y^1$ is —NR$^{1c}$R$^{2c}$—;
$R^{1c}$ is H;
$R^{2c}$ is H;
$Y^2$ is —NR$^{1d}$R$^{2d}$—;
$R^{1d}$ is H;
$R^{2d}$ is H;
the Ar groups are identical or different and are selected from

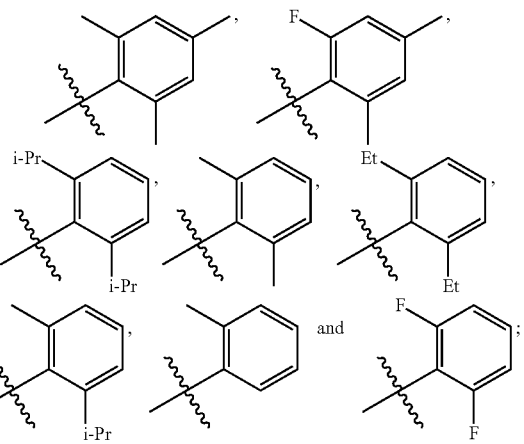

and
$R^{11a}$, $R^{12a}$, $R^{13a}$ and $R^{14a}$ are independently hydrogen.

In one embodiment, the invention provides an olefin metathesis catalyst, represented by the structure of Formula (A16B4CDII), wherein:
m is 0;
b is 0, or 1;
c is 0 or 1;
d is 0; $Y^3$ is N;
W is methyl, ethyl, fluoro, bromo, chloro, or —CN;
Z is methyl, or chloro;
$X^1$ and $X^2$ are independently chloro;
$R^1$ is hydrogen;
$R^2$ is phenyl or 2-methyl-1-propenyl; or $R^1$ and $R^2$ together form 3-phenyl-1-indenylidene;
$Y^1$ is —NR$^{1c}$R$^{2c}$—;
$R^{1c}$ is H;
$R^{2c}$ is H;
the Ar groups are identical or different and are selected from

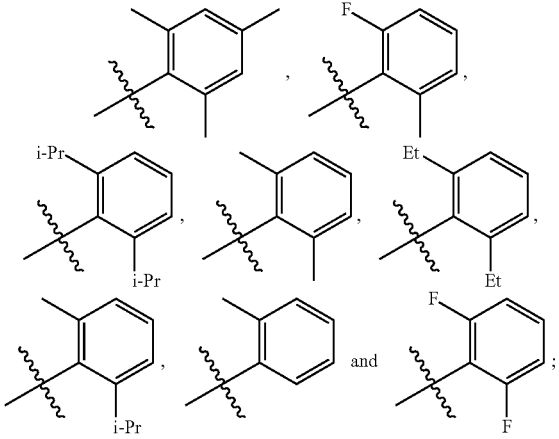

and
$R^{11a}$, $R^{12a}$, $R^{13a}$ and $R^{14a}$ are independently hydrogen.

In one embodiment, the invention provides an olefin metathesis catalyst, represented by the structure of Formula (A16B4CDIII),

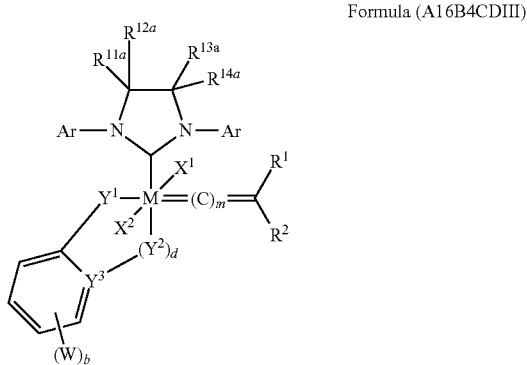

Formula (A16B4CDIII)

wherein: m is 0, 1 or 2:
b is 0, 1, 2, 3 or 4;
d is 0 when $Y^3$ is N; d is 1 when $Y^3$ is C;
W is optionally substituted $C_{1-24}$ alkyl, optionally substituted $C_{3-8}$ cycloalkyl, halogen, optionally substituted $C_5$-$C_{24}$ aryl, optionally substituted $C_6$-$C_{24}$ aralkyl, optionally substituted $C_1$-$C_{20}$ heteroalkyl, —C(O)$R^{21}$, —O$R^{22}$, —CN, —N$R^{23}R^{24}$, $NO_2$, —$CF_3$, —S(O)$_x R^{25}$, —P(O)(OH)$_2$, —OP(O)(OH)$_2$, —S$R^{27}$, or together with an adjacent W can form optionally substituted unsaturated polycyclic ring;
$X^1$ and $X^2$ are independently anionic ligands; generally, $X^1$ and $X^2$ are independently halogen, trifluoroacetate, perfluorophenols, —NCO, —CN, —NCS, —$N_3$; or $X^1$ together with $X^2$ can form a nitrate; typically, $X^1$ and $X^2$ are independently halogen, or —NCO;
$R^1$ and $R^2$ are independently selected from hydrogen, optionally substituted hydrocarbyl, optionally substituted heteroatom-containing hydrocarbyl; or any two or more of $X^1$, $X^2$, $R^1$, and $R^2$ are taken together to form one or more cyclic groups;
$Y^1$ is —N$R^{1c}R^{2c}$—;
$R^{1c}$ is H or optionally substituted $C_{1-24}$ alkyl;
$R^{2c}$ is H or optionally substituted $C_{1-24}$ alkyl;
$Y^2$ is —N$R^{1d}R^{2d}$—;
$R^{1d}$ is H or optionally substituted $C_{1-24}$ alkyl;
$R^{2d}$ is H or optionally substituted $C_{1-24}$ alkyl;
the Ar groups can be identical or different;
Ar is

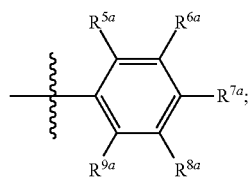

$R^{5a}$ is H, optionally substituted $C_{1-24}$ alkyl, halogen-C(O)$R^{21}$, —O$R^{22}$, —CN, —N$R^{23}R^{24}$, $NO_2$, —$CF_3$, —S(O)$_x R^{25}$, —P(O)(OH)$_2$, —OP(O)(OH)$_2$, —S$R^{27}$, optionally substituted heterocycle, optionally substituted $C_{3-8}$ cycloalkyl, optionally substituted $C_{5-24}$ aryl, optionally substituted $C_{3-8}$ cycloalkenyl, or together with $R^{6a}$ can form an optionally substituted polycyclic ring;

$R^{6a}$ is H, optionally substituted $C_{1-24}$ alkyl, halogen, —C(O)$R^{21}$, —O$R^{22}$, —CN, —N$R^{23}R^{24}$, $NO_2$, —$CF_3$, —S(O)$_x R^{25}$, —P(O)(OH)$_2$, —OP(O)(OH)$_2$, —S$R^{27}$, optionally substituted heterocycle, optionally substituted $C_{3-8}$ cycloalkyl, optionally substituted $C_{5-24}$ aryl, optionally substituted $C_{3-8}$ cycloalkenyl or together with $R^{5a}$ or together with $R^{7a}$ can form an optionally substituted polycyclic ring;

$R^{7a}$ is H, optionally substituted $C_{1-24}$ alkyl, halogen, —C(O)$R^{21}$, —O$R^{22}$, —CN, —N$R^{23}R^{24}$, $NO_2$, —$CF_3$, —S(O)$_x R^{25}$, —P(O)(OH)$_2$, —OP(O)(OH)$_2$, —S$R^{27}$, optionally substituted heterocycle, optionally substituted $C_{3-8}$ cycloalkyl, optionally substituted $C_{5-24}$ aryl, optionally substituted $C_{3-8}$ cycloalkenyl, or together with $R^{6a}$ or together with $R^{8a}$ can form an optionally substituted polycyclic ring;

$R^{8a}$ is H, optionally substituted $C_{1-24}$ alkyl, halogen-C(O)$R^{21}$, —O$R^{22}$, —CN, —N$R^{23}R^{24}$, $NO_2$, —$CF_3$, —S(O)$_x R^{25}$, —P(O)(OH)$_2$, —OP(O)(OH)$_2$, —S$R^{27}$, optionally substituted heterocycle, optionally substituted $C_{3-8}$ cycloalkyl, optionally substituted $C_{5-24}$ aryl, optionally substituted $C_{3-8}$ cycloalkenyl, or together with $R^{7a}$ or together with $R^{9a}$ can form an optionally substituted polycyclic ring;

$R^{9a}$ is H, optionally substituted $C_{1-24}$ alkyl, halogen, —C(O)$R^{21}$, —O$R^{22}$, —CN, —N$R^{23}R^{24}$, $NO_2$, —$CF_3$, —S(O)$_x R^{25}$, —P(O)(OH)$_2$, —OP(O)(OH)$_2$, —S$R^{27}$, optionally substituted heterocycle, optionally substituted $C_{3-8}$ cycloalkyl, optionally substituted $C_{5-24}$ aryl, optionally substituted $C_{3-8}$ cycloalkenyl, or together with $R^{8a}$ can form a polycyclic ring;

$R^{21}$ is OH, O$R^{26}$, N$R^{23}R^{24}$, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{22}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{23}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{24}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{25}$ is H, optionally substituted $C_{1-24}$ alkyl, O$R^{22}$, —N$R^{23}R^{24}$, optionally substituted heterocycle, optionally substituted $C_{3-8}$ cycloalkyl, optionally substituted $C_{5-24}$ aryl or optionally substituted $C_{3-8}$ cycloalkenyl;

$R^{26}$ is optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{27}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl; and $R^{11a}$, $R^{12a}$, $R^{13a}$ and $R^{14a}$ are independently hydrogen, unsubstituted $C_1$-$C_{12}$ alkyl, substituted $C_1$-$C_{12}$ alkyl, unsubstituted $C_1$-$C_{12}$ heteroalkyl, substituted $C_1$-$C_{12}$ heteroalkyl, unsubstituted $C_5$-$C_{14}$ aryl, or substituted $C_5$-$C_{14}$ aryl; or any two of $R^{11a}$, $R^{12a}$, $R^{13a}$, and $R^{14a}$, are optionally linked together to form a substituted or unsubstituted, saturated or unsaturated ring structure.

In one embodiment, the invention provides an olefin metathesis catalyst, represented by the structure of Formula (A16B4CDIII),
wherein: m is 0;
b is 0, 1 or 2;
d is 0; Y³ is N;
W is optionally substituted C$_{1-6}$ alkyl, halogen, —C(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, or —SR$^{27}$;
X¹ and X² are independently halogen;
R¹ is hydrogen;
R² is optionally substituted phenyl or optionally substituted 1-propenyl; or R¹ and R² together form an optionally substituted indenylid-1-ene;
Y¹ is —NR$^{1c}$R$^{2c}$—;
R$^{1c}$ is H;
R$^{2c}$ is H;
the Ar groups can be identical or different;
Ar is

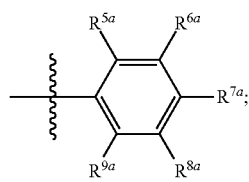

R$^{5a}$ is H, optionally substituted C$_{1-6}$ alkyl or halogen;
R$^{6a}$ is H, optionally substituted C$_{1-6}$ alkyl or halogen;
R$^{7a}$ is H, optionally substituted C$_{1-6}$ alkyl, or halogen;
R$^{8a}$ is H, optionally substituted C$_{1-6}$ alkyl, or halogen;
R$^{9a}$ is H, optionally substituted C$_{1-6}$ alkyl, or halogen; and
R$^{11a}$, R$^{12a}$, R$^{13a}$ and R$^{14a}$ are independently hydrogen, optionally substituted C$_1$-C$_6$ alkyl, optionally substituted C$_1$-C$_{12}$ heteroalkyl, optionally substituted C$_5$-C$_{14}$ aryl, or any two of R$^{11a}$, R$^{12a}$, R$^{13a}$, and R$^{14a}$, are optionally linked together to form a substituted or unsubstituted, saturated or unsaturated ring structure.

In one embodiment, the invention provides an olefin metathesis catalyst, represented by the structure of Formula (A16B4CDIII), wherein:
m is 0;
b is 0, 1 or 2;
d is 1; Y³ is C;
W is methyl, ethyl, bromo, chloro, fluoro, or together with an adjacent W forms a naphthalene ring;
X¹ and X² are independently chloro;
R¹ is hydrogen;
R² is phenyl or 2-methyl-1-propenyl; or R¹ and R² together form 3-phenyl-1-indenylidene;
Y¹ is —NR$^{1c}$R$^{2c}$—;
R$^{1c}$ is H;
R$^{2c}$ is H;
Y² is —NR$^{1d}$R$^{2d}$—;
R$^{1d}$ is H;
R$^{2d}$ is H;
the Ar groups are identical or different and are selected from

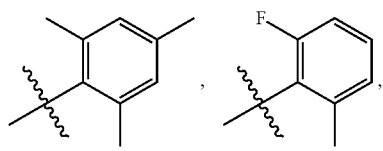

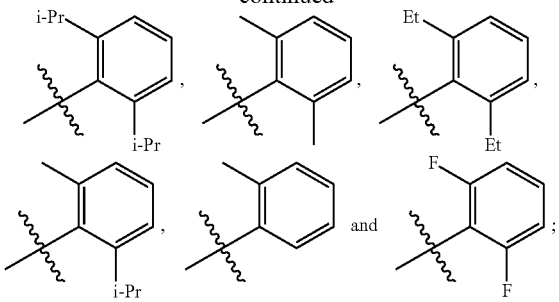

and
R$^{11a}$, R$^{12a}$, R$^{13a}$ and R$^{14a}$ are independently hydrogen.

In one embodiment, the invention provides an olefin metathesis catalyst wherein the Moiety (A) is represented by:

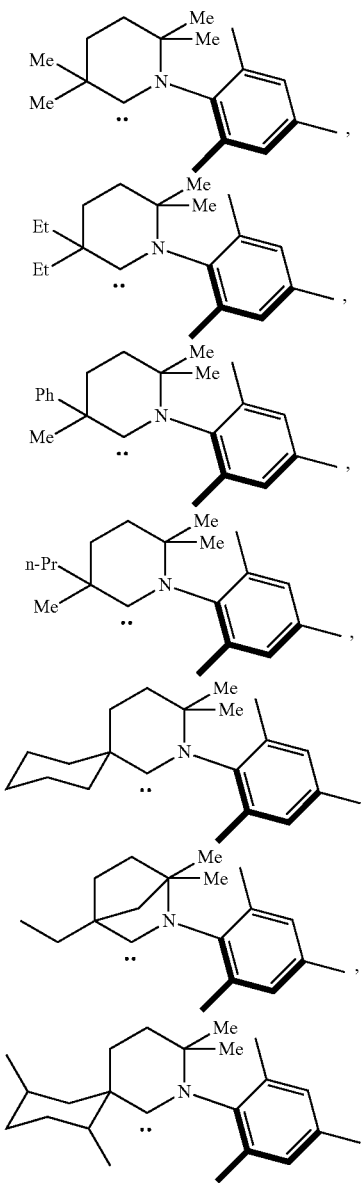

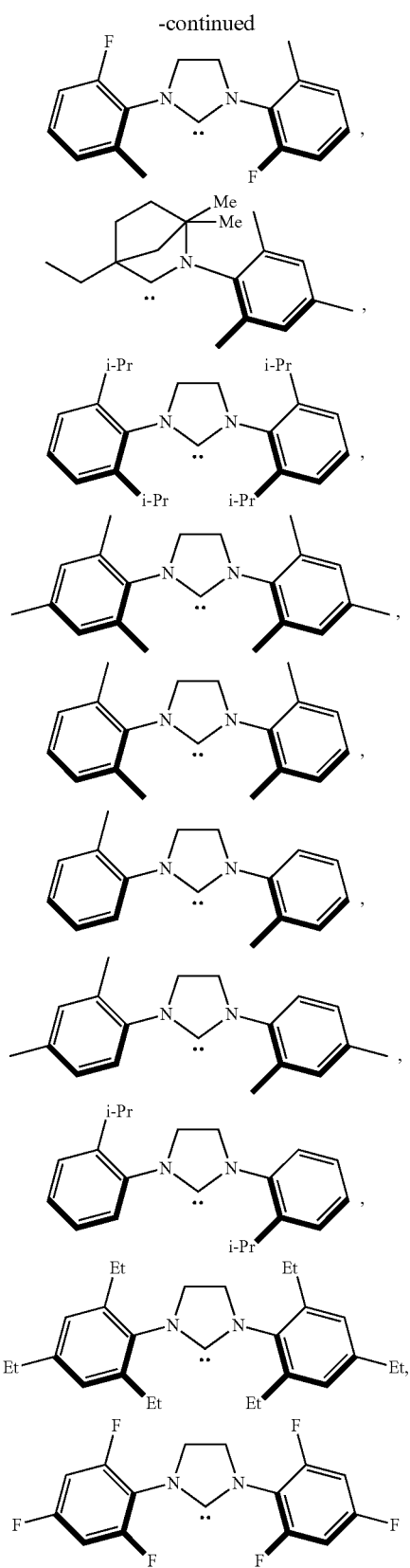
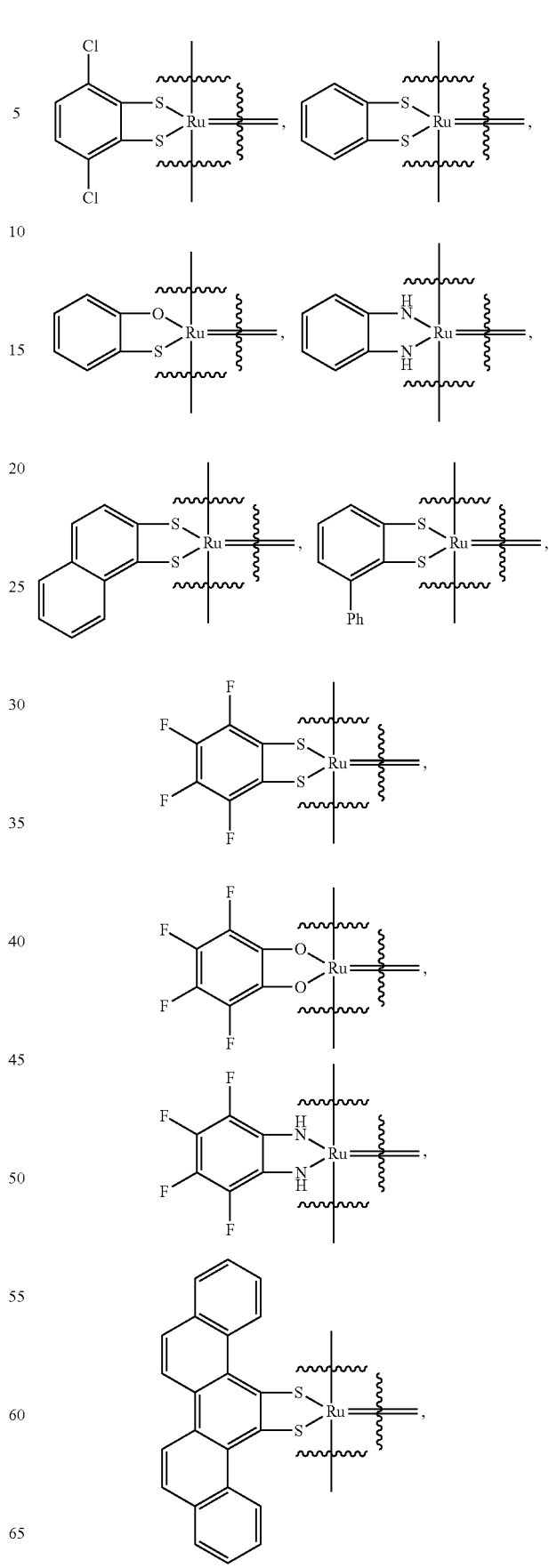
In one embodiment, the invention provides an olefin metathesis catalyst wherein the Moiety (B) is represented by:

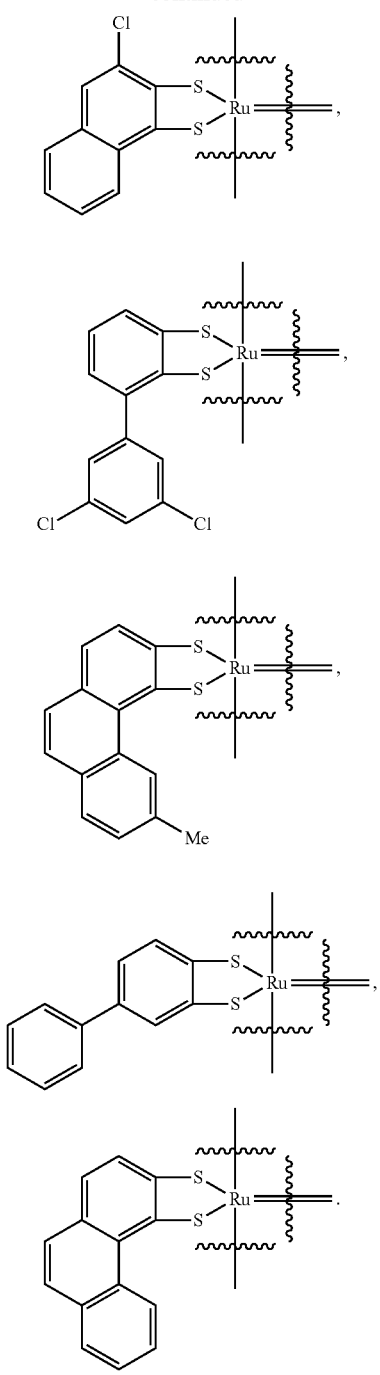
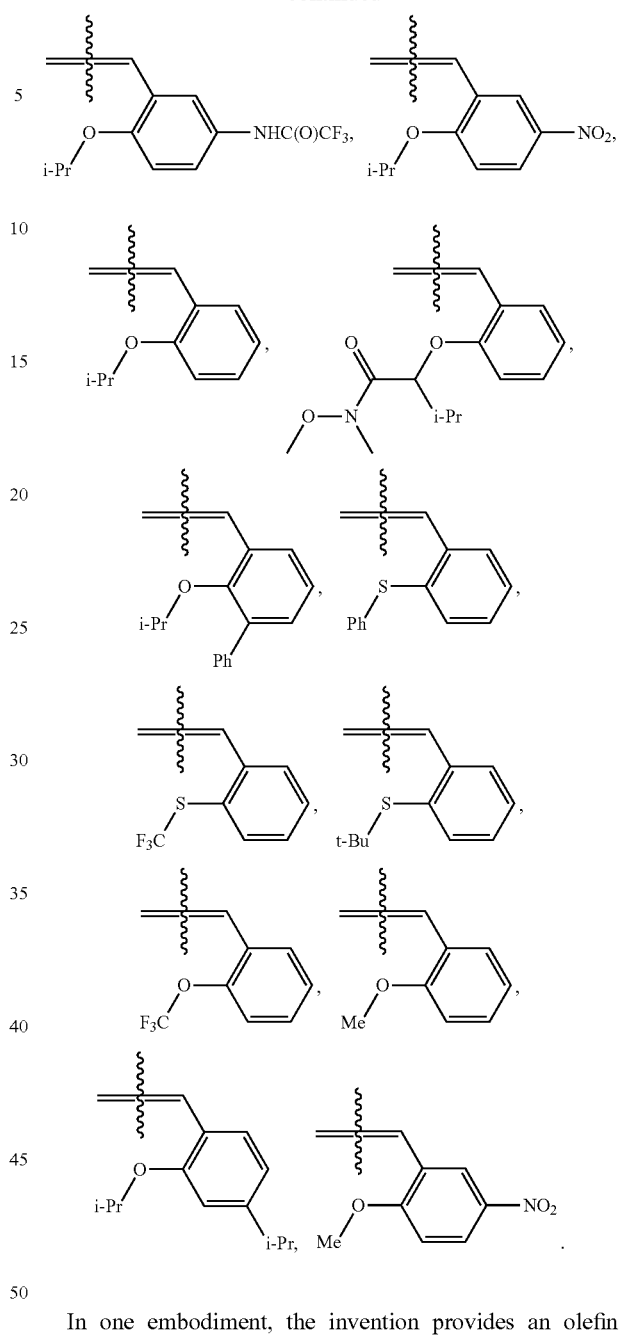
In one embodiment, the invention provides an olefin metathesis catalyst wherein the Moiety (C) is represented by:
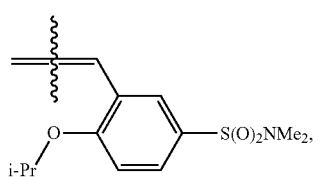
In one embodiment, the invention provides an olefin metathesis catalyst wherein the Moiety (DI) is represented by:
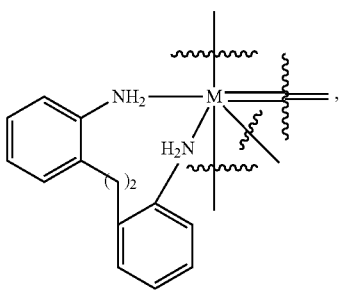

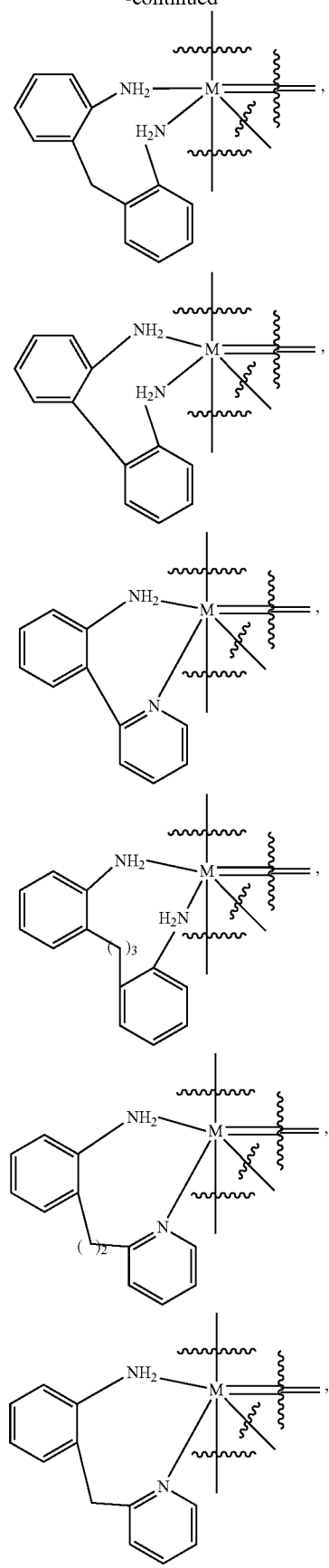
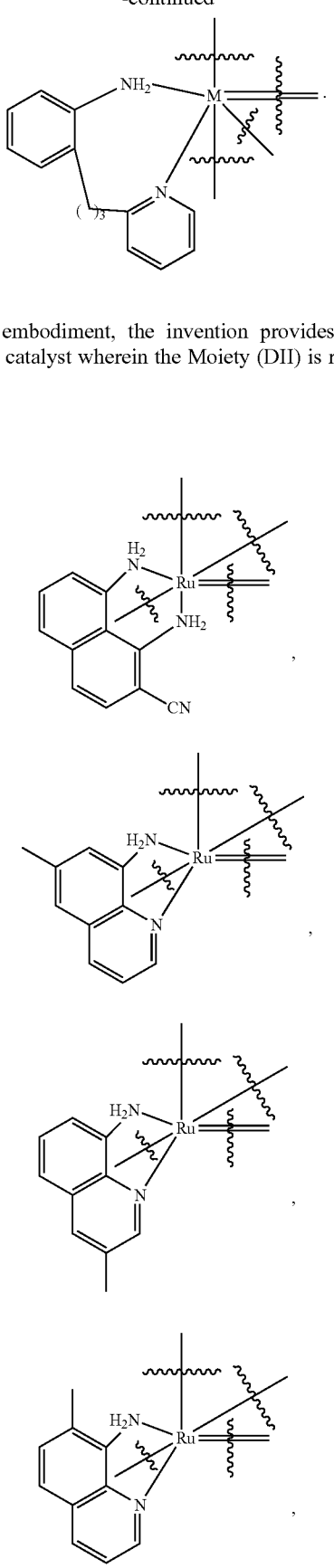
In one embodiment, the invention provides an olefin metathesis catalyst wherein the Moiety (DII) is represented by:

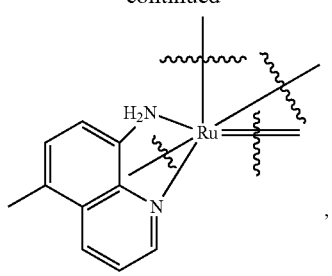

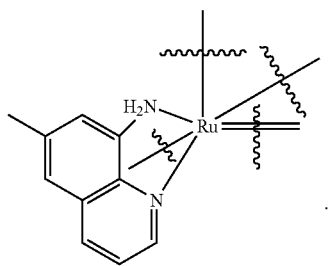

In one embodiment, the invention provides an olefin metathesis catalyst wherein the Moiety (DIII) is represented by:

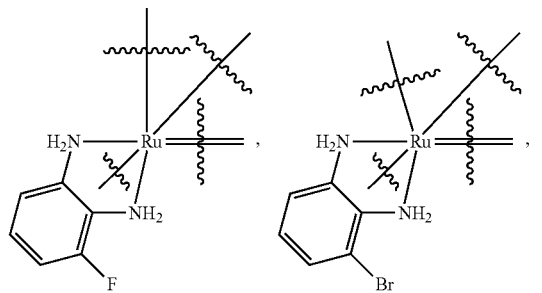

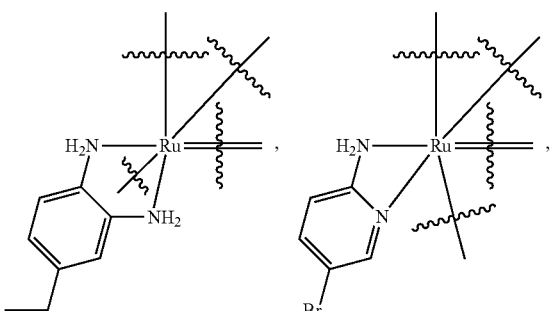

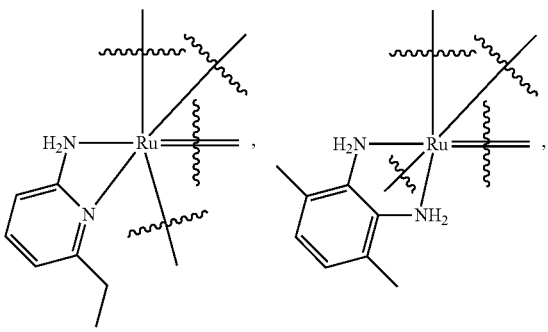

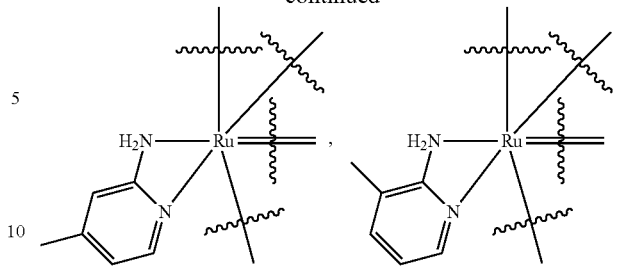

The present invention concerns also processes for preparing the olefin metathesis catalysts described herein. The olefin metathesis catalysts according to the invention can be prepared analogously to conventional methods as understood by the person skilled in the art of synthetic organic chemistry.

The following synthetic schemes illustrate how the olefin metathesis catalysts of the invention can be generally synthesized.

Scheme (2)

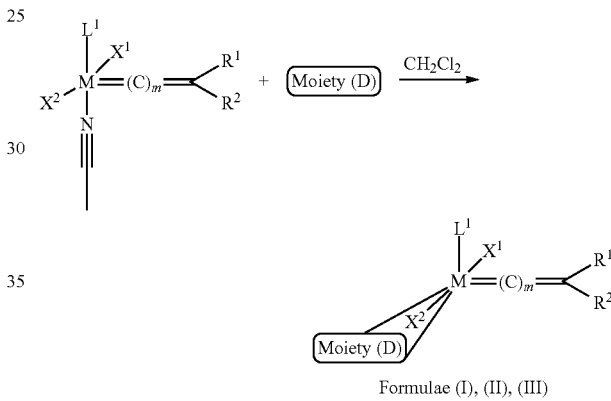

Formulae (I), (II), (III)

Generally, the reactions take place at room temperature. The ratio between the acetonitrile catalyst and Moiety (D), aniline type ligand, is 1:1 mol. The reaction mixture is stirred for 30 minutes, diluted with hexanes, and a microcrystalline precipitate is formed. The solid is filtrated, washed with hexanes and dried in vacuum to afford the new olefin metathesis catalysts.

At this stage, those skilled in the art will appreciate that many additional compounds that fall under the scope of the invention can be prepared by performing various common chemical reactions.

For example, the olefin metathesis catalysts are typically added to a resin composition as a solid, a solution, or as a suspension. When the olefin metathesis catalysts are added to a resin composition as a suspension, the olefin metathesis catalysts are suspended in a dispersing carrier such as mineral oil, paraffin oil, soybean oil, tri-iso-propyl-benzene, or any hydrophobic liquid which has an appropriately high viscosity so as to permit effective dispersion of the catalyst(s), and which is inert and which has a sufficiently high boiling point so that is does not act as a low-boiling impurity in the olefin metathesis reaction.

Olefins

Resin compositions that may be formed, comprise one or more cyclic olefins, besides the olefin metathesis catalysts of the invention. The cyclic olefin may generally be any strained or unstrained cyclic olefin, provided the cyclic olefin is able to participate in a ROMP reaction either individually or as part of a ROMP cyclic olefin composition. Such cyclic olefins may be optionally substituted, optionally heteroatom-containing, mono-unsaturated, di-unsaturated, or poly-unsaturated $C_5$ to $C_{24}$ hydrocarbons that may be mono-, di-, or poly-cyclic.

Examples of bicyclic and polycyclic olefins thus include, without limitation, dicyclopentadiene (DCPD); trimer and other higher order oligomers of cyclopentadiene including without limitation tricyclopentadiene (cyclopentadiene trimer), cyclopentadiene tetramer, and cyclopentadiene pentamer; ethylidenenorbornene; dicyclohexadiene; norbornene; $C_2$-$C_{12}$ hydrocarbyl substituted norbornenes; 5-butyl-2-norbornene; 5-hexyl-2-norbornene; 5-octyl-2-norbornene; 5-decyl-2-norbornene; 5-dodecyl-2-norbornene; 5-vinyl-2-norbornene; 5-ethylidene-2-norbornene; 5-isopropenyl-2-norbornene; 5-propenyl-2-norbornene; 5-butenyl-2-norbornene; 5-tolyl-norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethyoxycarbonyl-1-norbornene; 5-methyl-5-methoxy-carbonylnorbornene; bicyclo[2.2.1]hept-2-ene-2-carboxylic acid, 2-ethylhexyl ester; 5-cyanonorbornene; 5,5,6-trimethyl-2-norbornene; cyclo-hexenylnorbornene; endo, exo-5,6-dimethoxynorbornene; endo, endo-5,6-dimethoxynorbornene; endo, exo-5,6-dimethoxy carbonylnorbornene; endo,endo-5,6-dimethoxycarbonylnorbornene; 2,3-dimethoxynorbornene; norbornadiene; tricycloundecene; tetracyclododecene; 8-methyl tetracyclododecene; 8-ethyltetracyclododecene; 8-methoxy carbonyltetracyclo dodecene; 8-methyl-8-tetra cyclododecene; 8-cyanotetracyclo dodecene; pentacyclopentadecene; pentacyclo hexadecene; bicyclo[2.2.1]hept-2-ene-5-phenoxymethyl; 2-ethylhexyl ester-bicyclo[2.2.1]hept-5-ene-2-carboxylic acid; 2-hydroxyethyl ester-bicyclo[2.2.1]hept-5-ene-2-carboxylic acid; bicyclo[2.2.1]hept-5-ene-2-methanol; bicyclo[2.2.1]hept-5-ene-2-heptanoic acid-methyl ester; bicyclo[2.2.1]hept-5-ene-2-hexanoic acid-methyl ester; 1,4:5,8-dimethanonaphthalene, 2-hexyl-1,2,3,4,4a,5,8,8a-octahydro; bicyclo[2.2.1]hept-5-ene-2-octanoic acid-methyl ester; 1,4:5,8-dimethano naphthalene; 2-butyl-1,2,3,4,4a,5,8,8a-octahydro; ethylidenetetracyclododecene; 2-vinyl-1,2,3,4,4a,5,8,8a-octahydro-1,4:5,8-dimethano naphthalene; and the like, and their structural isomers, stereoisomers, and mixtures thereof.

EXPERIMENTAL

General Information—Materials and Methods

In the following examples, efforts have been made to ensure accuracy with respect to numbers used (e.g., amounts, temperature, etc.) but some experimental error and deviation should be accounted for. The examples are to be considered as not being limiting of the invention described herein.

All reactions involving metal complexes were conducted in oven-dried glassware under an argon or nitrogen atmosphere using standard Schlenk techniques. Chemicals and solvents were obtained from Sigma-Aldrich, Strem, Alfa Aesar, Nexeo, Brenntag, AG Layne and TCI. Commercially available reagents were used as received unless otherwise noted. Silica gel was purchased from Fisher (0.040-0.063 μm, EMD Millipore).

Catalysts C710 (M34) was prepared using known methods as described in WO2018/034931 A1.

$^1$H NMR spectra were recorded on a Varian 400 MHz spectrometer. Chemical shifts are reported in ppm downfield from Me$_4$Si by using the residual solvent peak as an internal standard (CD$_2$Cl$_2$ δ 5.32 ppm). Spectra were analyzed and processed using MestReNova software.

The GC analyses were run using a flame ionization detector. The Column used is: HP-5 from J&W, 30 m-0.25 mm i.d.-0.25 μm film thickness. GC method conditions: injection temperature, 250° C.; detector temperature, 280° C.; oven temperature, starting temperature, 100° C.; hold time, 1 min. The ramp rate was 10° C./min to 250° C., hold time 12 min; carrier gas helium.

The following abbreviations are used in the examples:

| | |
|---|---|
| mL | milliliter |
| CD$_2$Cl$_2$ | deuterated dichloromethane |

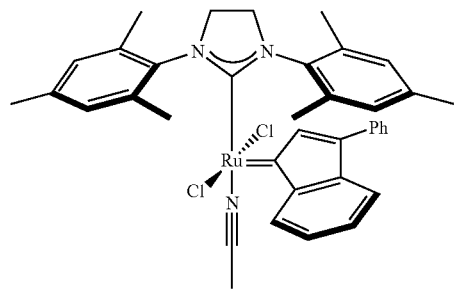

| | |
|---|---|
| C710 (M34) | [1,3-bis-(2,4,6-trimethylphenyl)-2-imidazolidinylidene]dichloro (phenylindenylidene)(acetonitrile)ruthenium(II) |

EXAMPLES

Example 1

Synthesis of C853

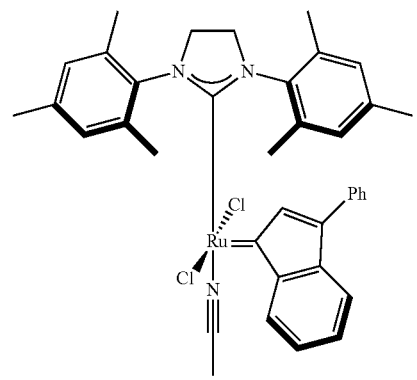

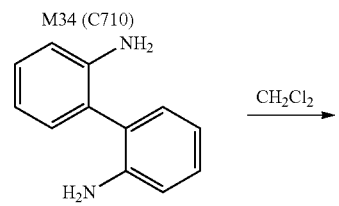

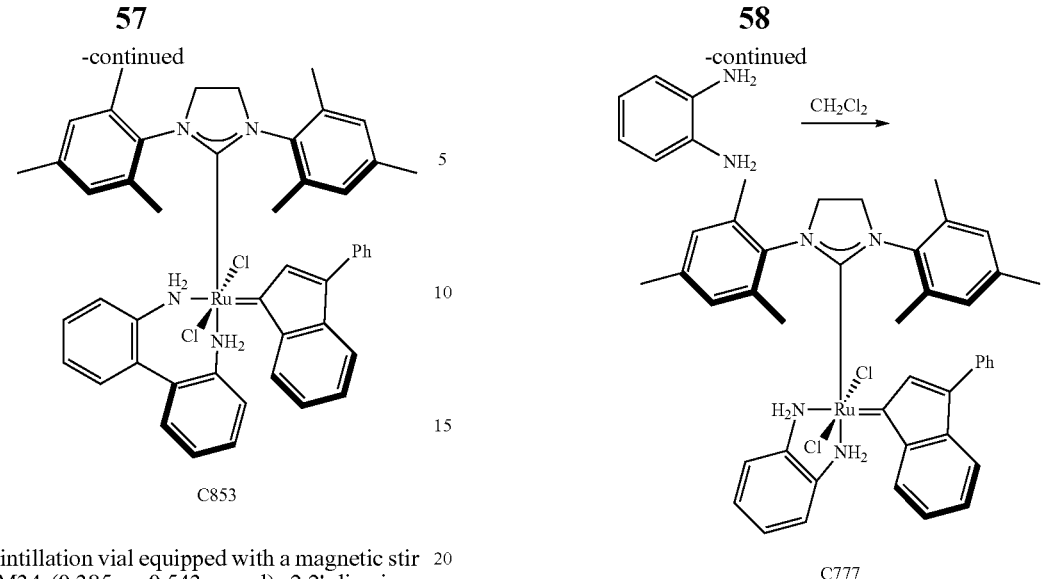

C853

To a 40 mL scintillation vial equipped with a magnetic stir bar was added M34 (0.385 g, 0.543 mmol), 2,2'-diaminobiphenyl (0.100 g, 0.543 mmol), and 3 mL dichloromethane. The reaction was stirred at ambient temperature for 30 minutes then slowly diluted with hexanes (35 mL. After an additional 30 minutes of stirring the resulting microcrystalline precipitate was isolated by filtration, washed with hexanes (2×5 mL) then dried in vacuo to afford C853 (0.354 g, 76.5% yield).
C853 exists in solution as a mixture of two isomers with an approximate ratio of 73:27

$^1$H NMR (400 MHz, CD$_2$Cl$_2$, major isomer) δ 8.79 (d, J=7.3 Hz, 1H), 7.85 (d, J=7.3 Hz, 2H), 7.60 (t, J=7.4 Hz, 1H), 7.47-7.32 (m, 4H), 7.27 (d, J=7.2 Hz, 1H), 7.22-7.07 (m, 4H), 7.06-7.02 (m, 2H), 6.98 (t, J=7.2 Hz, 2H), 6.90 (s, 1H), 6.56 (br s, 1H), 6.30 (br s, 2H), 6.16 (br s, 1H), 4.58 (br s, 4H), 4.03-4.15 (m, 1H), 4.00-3.86 (m, 2H), 3.76 (d, J=9.6 Hz, 1H), 2.85 (s, 3H), 2.67 (s, 3H), 2.41 (s, 3H), 2.37 (s, 3H), 1.79 (s, 31-1), 1.75 (s, 3H).

$^1$H NMR (400 MHz, CD$_2$Cl$_2$, minor isomer, selected resonances) δ 9.08-9.03 (m, 1H), 7.79 (d, J=7.5 Hz, 2H), 7.56 (t, J=7.4 Hz, 1H), 6.58 (d, J=8.3 Hz, 2H), 6.54 (br s, 1H), 6.12 (br s, 1H), 4.31 (s, 4H), 4.00-3.88 (m, 3H), 3.83-3.69 (m, 1H), 2.96 (br s, 3H), 2.51 (br s, 3H), 2.41 (br s, 3H), 2.33 (br s, 3H), 1.85 (br s, 3H), 1.79 (br s, 3H).

Example 2

Synthesis C777

C777

To a 40 mL scintillation vial equipped with a magnetic stir bar was added M34 (0.328 g, 0.462 mmol), 1,2-phenylenediamine (0.050 g, 0.462 mmol), and 3 mL dichloromethane. The reaction was stirred at ambient temperature for thirty minutes then slowly diluted with hexanes (35 mL). After an additional 30 minutes of stirring the resulting microcrystalline precipitate was isolated by filtration, washed with hexanes (2×5 mL) then dried in vacuo to afford C777 (0.241 g, 67.1% yield).

$^1$H NMR (400 MHz, CD$_2$Cl$_2$) δ 8.93 (d, J=7.3 Hz, 1H), 7.81 (d, J=7.5 Hz, 2H), 7.55 (t, J=7.5 Hz, 1H), 7.37 (dd, J=15.7, 7.8 Hz, 4H), 7.32, (br s, 1H), 7.24 (dd, J=13.4, 7.2 Hz, 2H), 7.01 (dd, J=5.6, 3.4 Hz, 2H), 6.90 (s, 1H), 6.81 (dd, J=4.8, 4.3 Hz, 2H), 6.53 (br s, 1H), 6.19 (br s, 1H), 4.37 (s, 4H), 4.15-4.02 (m, 1H), 4.02-3.86 (m, 2H), 3.84-3.67 (m, 1H), 2.88 (s, 3H), 2.59 (s, 3H), 2.54 (s, 3H), 2.40 (s, 3H), 1.76 (s, 6H).

Example 3

Synthesis of C813

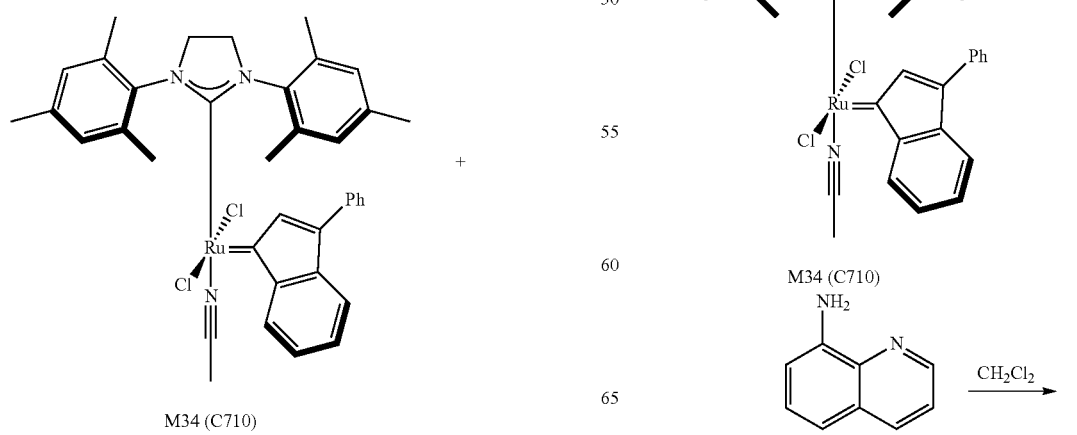

M34 (C710)

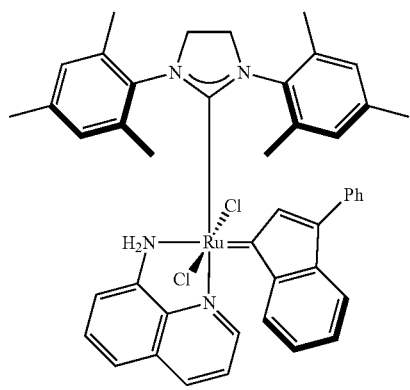

C813

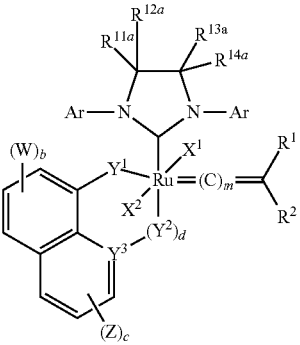

Formula (A16B4CDII)

To a 40 mL scintillation vial equipped with a magnetic stir bar was added M34 (0.400 g, 0.564 mmol), 8-aminoquinoline (0.081 g, 0.56 mmol), and 5 mL dichloromethane. The reaction was stirred at ambient temperature for thirty minutes then slowly diluted with hexanes (35 mL). After an additional fifteen minutes of stirring the resulting precipitate was isolated by filtration, washed with hexanes (2×15 mL) then dried in vacuo to afford C813 (0.392 g, 85.6% yield).

$^1$H NMR (400 MHz, CD$_2$Cl$_2$) δ 8.95 (d, J=7.4 Hz, 1H), 8.11 (d, J=4.9 Hz, 1H), 7.92 (d, J=7.9 Hz, 3H), 7.63-7.52 (m, 2H), 7.51-7.38 (m, 6H), 7.37-7.27 (m, 2H), 7.21 (t, J=6.5 Hz, 2H), 6.91 (dd, J=8.2, 5.2 Hz, 1H), 6.53 (s, 1H), 6.09 (s, 1H), 5.83 (br d, J=10.5 Hz, 1H), 5.46 (br d, J=10.7 Hz, 1H), 4.19-4.01 (m, 2H), 4.00-3.87 (m, 1H), 3.87-3.74 (m, 1H), 2.84 (s, 3H), 2.67 (s, 6H), 2.30 (s, 3H), 1.92 (s, 3H), 1.81 (s, 3H).

Ring Closing Metathesis of Diethyl Diallylmalonate

Figure 3:
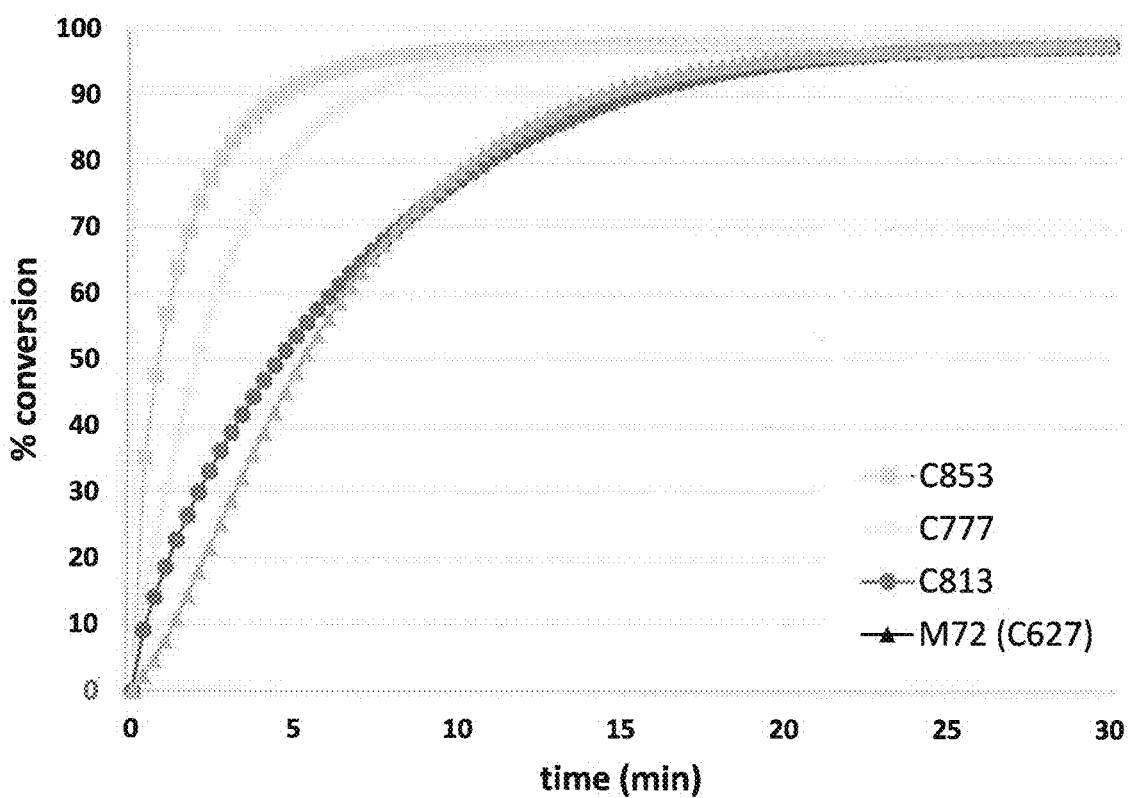
FIG. 3 shows the conversion vs time, of diethyl diallylmalonate to diethyl cyclopent-3-ene-1,1-dicarboxylate in the presence of olefin metathesis catalysts of the invention.

C853, C777, and C813 were benchmarked against the ring closing metathesis of diethyl diallylmalonate and compared to the standard C627. The progress of these reactions was followed by GC. Reactions catalyzed by C853 and C777 both afforded complete conversion to diethyl cyclopent-3-ene-1,1-dicarboxylate in less than 15 minutes whereas reactions catalyzed by C813 or M72 (C627) required approximately 30 minutes, as seen in FIG. 3.

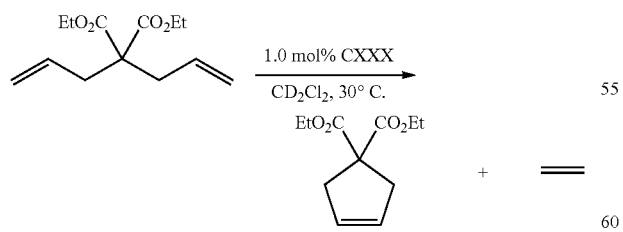

What is claimed is:

1. An olefin metathesis catalyst comprising cyclic alkyl amino carbenes, represented by the structure of Formula (A16B4CDII)

wherein:
Y$^3$ is C or N;
m is 0, 1 or 2;
b is 0, 1, 2 or 3;
c is 0, 1, 2 or 3;
d is 0 when Y$^3$ is N; d is 1 when Y$^3$ is C;
W is optionally substituted C$_{1-24}$ alkyl, optionally substituted C$_{3-8}$ cycloalkyl, halogen, optionally substituted C$_5$-C$_{24}$ aryl, optionally substituted C$_6$-C$_{24}$ aralkyl, optionally substituted C$_1$-C$_{20}$ heteroalkyl, —C(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, or together with an adjacent W can form optionally substituted unsaturated polycyclic ring;
Z is optionally substituted C$_{1-24}$ alkyl, optionally substituted C$_{3-8}$ cycloalkyl, halogen, optionally substituted C$_5$-C$_{24}$ aryl, optionally substituted C$_6$-C$_{24}$ aralkyl, optionally substituted C$_1$-C$_{20}$ heteroalkyl, —C(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{27}$, or together with an adjacent Z can form optionally substituted unsaturated polycyclic ring;
x is 1 or 2;
X$^1$ and X$^2$ are independently anionic ligands;
R$^1$ and R$^2$ are independently selected from hydrogen, optionally substituted hydrocarbyl, optionally substituted heteroatom-containing hydrocarbyl; or any two or more of X$^1$, X$^2$, R$^1$, and R$^2$ are taken together to form one or more cyclic groups;
Y$^1$ is —NR$^{1c}$R$^{2c}$—;
R$^{1c}$ is H or optionally substituted C$_{1-24}$ alkyl;
R$^{2c}$ is H or optionally substituted C$_{1-24}$ alkyl;
Y$^2$ is —NR$^{1d}$R$^{2d}$—;
R$^{1d}$ is H or optionally substituted C$_{1-24}$ alkyl;
R$^{2d}$ is H or optionally substituted C$_{1-24}$ alkyl;
the Ar groups can be identical or different;
Ar is

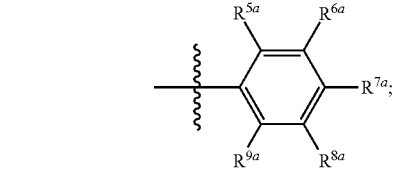

R$^{5a}$ is H, optionally substituted C$_{1-24}$ alkyl, halogen, —C(O)R$^{21}$, —OR$^{22}$, —CN, —NR$^{23}$R$^{24}$, NO$_2$, —CF$_3$, —S(O)$_x$R$^{25}$, —P(O)(OH)$_2$, —OP(O)(OH)$_2$, —SR$^{26}$, optionally substituted heterocycle, optionally substituted $C_{3-8}$ cycloalkyl, optionally substituted $C_{5-24}$ aryl, optionally substituted $C_{3-8}$ cycloalkenyl, or together with $R^{6a}$ can form an optionally substituted polycyclic ring;

$R^{6a}$ is H, optionally substituted $C_{1-24}$ alkyl, halogen, —C(O)$R^{21}$, —O$R^{22}$, —CN, —N$R^{23}R^{24}$, NO$_2$, —CF$_3$, —S(O)$_x R^{25}$, —P(O)(OH)$_2$, —OP(O)(OH)$_2$, —S$R^{26}$, optionally substituted heterocycle, optionally substituted $C_{3-8}$ cycloalkyl, optionally substituted $C_{5-24}$ aryl, optionally substituted $C_{3-8}$ cycloalkenyl or together with $R^{5a}$ or together with $R^{7a}$ can form an optionally substituted polycyclic ring;

$R^{7a}$ is H, optionally substituted $C_{1-24}$ alkyl, halogen, —C(O)$R^{21}$, —O$R^{22}$, —CN, —N$R^{23}R^{24}$, NO$_2$, —CF$_3$, —S(O)$_x R^{25}$, —P(O)(OH)$_2$, —OP(O)(OH)$_2$, —S$R^{26}$, optionally substituted heterocycle, optionally substituted $C_{3-8}$ cycloalkyl, optionally substituted $C_{5-24}$ aryl, optionally substituted $C_{3-8}$ cycloalkenyl, or together with $R^{6a}$ or together with $R^{8a}$ can form an optionally substituted polycyclic ring;

$R^{8a}$ is H, optionally substituted $C_{1-24}$ alkyl, halogen, —C(O)$R^{21}$, —O$R^{22}$, —CN, —N$R^{23}R^{24}$, NO$_2$, —CF$_3$, —S(O)$_x R^{25}$, —P(O)(OH)$_2$, —OP(O)(OH)$_2$, —S$R^{26}$, optionally substituted heterocycle, optionally substituted $C_{3-8}$ cycloalkyl, optionally substituted $C_{5-24}$ aryl, optionally substituted $C_{3-8}$ cycloalkenyl, or together with $R^{7a}$ or together with $R^{9a}$ can form an optionally substituted polycyclic ring;

$R^{9a}$ is H, optionally substituted $C_{1-24}$ alkyl, halogen, —C(O)$R^{21}$, —O$R^{22}$, —CN, —N$R^{23}R^{24}$, NO$_2$, —CF$_3$, —S(O)$_x R^{25}$, —P(O)(OH)$_2$, —OP(O)(OH)$_2$, —S$R^{26}$, optionally substituted heterocycle, optionally substituted $C_{3-8}$ cycloalkyl, optionally substituted $C_{5-24}$ aryl, optionally substituted $C_{3-8}$ cycloalkenyl, or together with $R^{8a}$ can form a polycyclic ring;

$R^{21}$ is OH, O$R^{26}$, N$R^{23}R^{24}$, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{22}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{23}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{24}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{25}$ is H, optionally substituted $C_{1-24}$ alkyl, O$R^{22}$, —N$R^{23}R^{24}$, optionally substituted heterocycle, optionally substituted $C_{3-8}$ cycloalkyl, optionally substituted $C_{5-24}$ aryl or optionally substituted $C_{3-8}$ cycloalkenyl;

$R^{26}$ is optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl;

$R^{27}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-8}$ cycloalkenyl; and $R^{11a}$, $R^{12a}$, $R^{13a}$ and $R^{14a}$ are independently hydrogen, unsubstituted $C_1$-$C_{12}$ alkyl, substituted $C_1$-$C_{12}$ alkyl, unsubstituted $C_1$-$C_{12}$ heteroalkyl, substituted $C_1$-$C_{12}$ heteroalkyl, unsubstituted $C_5$-$C_{14}$ aryl, or substituted $C_5$-$C_{14}$ aryl; or any two of $R^{11a}$, $R^{12a}$, $R^{13a}$, and $R^{14a}$, are optionally linked together to form a substituted or unsubstituted, saturated or unsaturated ring structure.

2. The olefin metathesis catalyst of claim 1, wherein:
$Y^3$ is C or N;
m is 0;
b is 0, 1 or 2;
c is 0 or 1;
d is 0 when $Y^3$ is N; d is 1 when $Y^3$ is C;
W is optionally substituted $C_{1-12}$ alkyl, halogen, —C(O)$R^{21}$, —O$R^{22}$, —CN, —N$R^{23}R^{24}$, NO$_2$, —CF$_3$, —S(O)$_x R^{25}$, —P(O)(OH)$_2$, —OP(O)(OH)$_2$, or —S$R^{27}$;
Z is optionally substituted $C_{1-12}$ alkyl, halogen, —C(O)$R^{21}$, —O$R^{22}$, —CN, —N$R^{23}R^{24}$, NO$_2$, —CF$_3$, —S(O)$_x R^{25}$, —P(O)(OH)$_2$, —OP(O)(OH)$_2$, or —S$R^{27}$;
$X^1$ and $X^2$ are independently halogen;
$R^1$ is hydrogen;
$R^2$ is optionally substituted phenyl, or optionally substituted 1-propenyl; or $R^1$ and $R^2$ together form an optionally substituted indenylid-1-ene;
$Y^1$ is —N$R^{1c}R^{2c}$—;
$R^{1c}$ is H or optionally substituted $C_{1-12}$ alkyl;
$R^{2c}$ is H or optionally substituted $C_{1-12}$ alkyl;
$Y^2$ is —N$R^{1d}R^{2d}$—;
$R^{1d}$ is H or optionally substituted $C_{1-12}$ alkyl;
$R^{2d}$ is H or optionally substituted $C_{1-12}$ alkyl;
the Ar groups can be identical or different;
Ar is

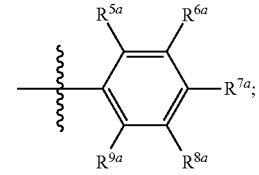

$R^{5a}$ is H, optionally substituted $C_{1-12}$ alkyl or halogen;
$R^{6a}$ is H, optionally substituted $C_{1-12}$ alkyl or halogen;
$R^{7a}$ is H, optionally substituted $C_{1-12}$ alkyl, or halogen;
$R^{8a}$ is H, optionally substituted $C_{1-12}$ alkyl, or halogen;
$R^{9a}$ is H, optionally substituted $C_{1-12}$ alkyl, or halogen; and
$R^{11a}$, $R^{12a}$, $R^{13a}$ and $R^{14a}$ are independently hydrogen, optionally substituted $C_1$-$C_6$ alkyl, optionally substituted $C_1$-$C_{12}$ heteroalkyl, optionally substituted $C_5$-$C_{14}$ aryl, or any two of $R^{11a}$, $R^{12a}$, $R^{13a}$, and $R^{14a}$, are optionally linking together to form a substituted or unsubstituted, saturated or unsaturated ring structure.

3. The olefin metathesis catalyst of claim 1, wherein:
m is 0;
b is 0 or 1;
c is 0 or 1;
d is 1; $Y^3$ is C;
W is methyl, ethyl, fluoro, bromo, chloro, or —CN;
Z is methyl, bromo or chloro;
$X^1$ and $X^2$ are independently chloro;
$R^1$ is hydrogen;
$R^2$ is phenyl or 2-methyl-1-propenyl; or $R^1$ and $R^2$ together form 3-phenyl-1-indenylidene;
$Y^1$ is —N$R^{1c}R^{2c}$—;
$R^{1c}$ is H;
$R^{2c}$ is H;
$Y^2$ is —N$R^{1d}R^{2d}$—;
$R^{1d}$ is H;
$R^{2d}$ is H;

the Ar groups are identical or different and are selected from

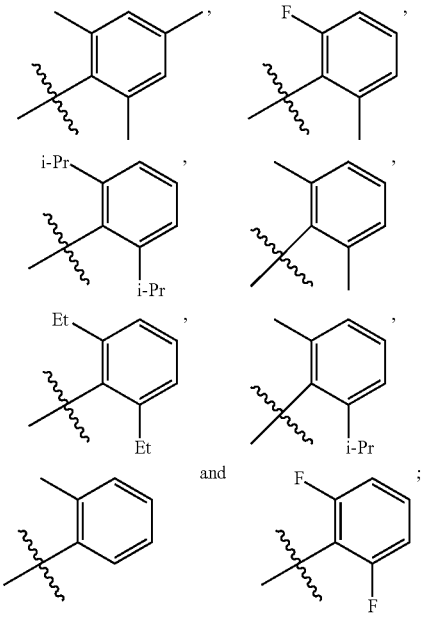

and
$R^{11a}$, $R^{12a}$, $R^{13a}$ and $R^{14a}$ are independently hydrogen.

4. The olefin metathesis catalyst of claim 1, wherein:
m is 0;
b is 0, or 1;
c is 0 or 1;
d is 0; $Y^3$ is N;
W is methyl, ethyl, fluoro, bromo, chloro, or —CN;
Z is methyl, or chloro;
$X^1$ and $X^2$ are independently chloro;
$R^1$ is hydrogen;
$R^2$ is phenyl or 2-methyl-1-propenyl; or $R^1$ and $R^2$ together form 3-phenyl-1-indenylidene;
$Y^1$ is —$NR^{1c}R^{2c}$—;
$R^{1c}$ is H;
$R^{2c}$ is H;
the Ar groups are identical or different and are selected from

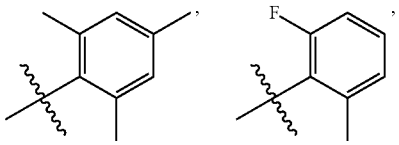

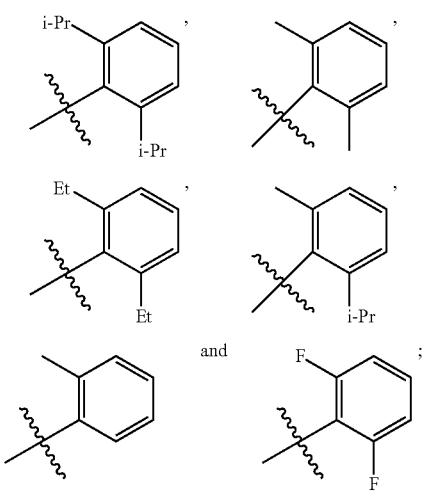

and
$R^{11a}$, $R^{12a}$, $R^{13a}$ and $R^{14a}$ are independently hydrogen.

5. The olefin metathesis catalyst of claim 1, wherein:
d=0; $Y^3$=N; and
$R^1$ and $R^2$ are taken together to form one or more cyclic groups.

6. The olefin metathesis catalyst of claim 5, wherein $R^1$ and $R^2$ form a phenylindenylidene.

7. The olefin metathesis catalyst of claim 1, wherein:
d=0; $Y^3$ is N; $R^1$ is H and $R^2$ is aryl or alkenyl.

8. The olefin metathesis catalyst of claim 1, wherein the catalyst is of formula C813

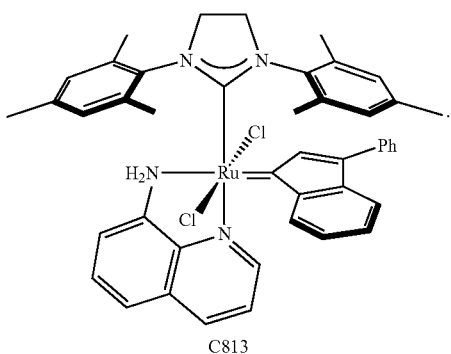

C813

* * * * *